United States Patent [19]

Berger

[11] Patent Number: 5,696,800
[45] Date of Patent: Dec. 9, 1997

[54] DUAL TRACKING DIFFERENTIAL MANCHESTER DECODER AND CLOCK RECOVERY CIRCUIT

[75] Inventor: Lior Berger, Haifa, Israel

[73] Assignee: Intel Corporation, Santa Clara, Calif.

[21] Appl. No.: 408,647

[22] Filed: Mar. 22, 1995

[51] Int. Cl.[6] .................. H04L 7/02; H04L 7/06
[52] U.S. Cl. ............ 375/361; 375/360; 375/371; 341/70; 370/516
[58] Field of Search ................. 375/359–361, 375/333, 371, 373; 341/70–72; 370/516–519

[56] References Cited

U.S. PATENT DOCUMENTS

| | | | |
|---|---|---|---|
| 4,546,486 | 10/1985 | Evans | 375/361 X |
| 4,547,764 | 10/1985 | Levy-Navarro et al. | 375/361 X |
| 4,567,604 | 1/1986 | Jacksier | 375/333 |
| 4,584,695 | 4/1986 | Wong et al. | 375/327 |
| 4,746,898 | 5/1988 | Loeppert | 375/333 X |
| 4,788,695 | 11/1988 | Iverson et al. | 375/359 X |
| 4,862,482 | 8/1989 | Patchen | 375/361 |
| 4,876,700 | 10/1989 | Grindahl | 375/333 |
| 4,912,730 | 3/1990 | Erhart | 375/361 |
| 5,023,891 | 6/1991 | Johnson, III | 375/333 |
| 5,040,193 | 8/1991 | Leonowich et al. | 375/333 |
| 5,103,466 | 4/1992 | Bazes | 375/361 |
| 5,163,067 | 11/1992 | Wight et al. | 375/333 |
| 5,446,765 | 8/1995 | Leger | 375/359 |
| 5,465,268 | 11/1995 | Rainbolt | 375/333 |
| 5,491,713 | 2/1996 | Kwok et al. | 375/333 |

*Primary Examiner*—Young T. Tse
*Attorney, Agent, or Firm*—Blakely, Sokoloff, Taylor & Zafman

[57] ABSTRACT

A dual clock tracking decoder for use in a local station of a token ring local area network extracts the mostly repetitive bit-cell transitions corresponding to the imbedded clock of a received phase encoded message from which a short term and a long term moving average estimate is made of the clock transitions relative to a local stable clock. The short term moving average adjusts rapidly to short term jitter and is used to sample the received phase encoded message twice each bit-cell and generate an intermediate phase encoded message that is resynchronized with a clock derived from the long term moving average of the estimated imbedded clock transition and having a rate that is twice the bit-cell rate of the received phase encoded message. This provides a mechanism for sampling the states of the incoming message with a clock that is adaptive to fast short term jitter while restoring an imbedded clock that is only responsive to slow longer term jitter. The latter clock is used to resynchronize the intermediate phase encoded message.

20 Claims, 17 Drawing Sheets

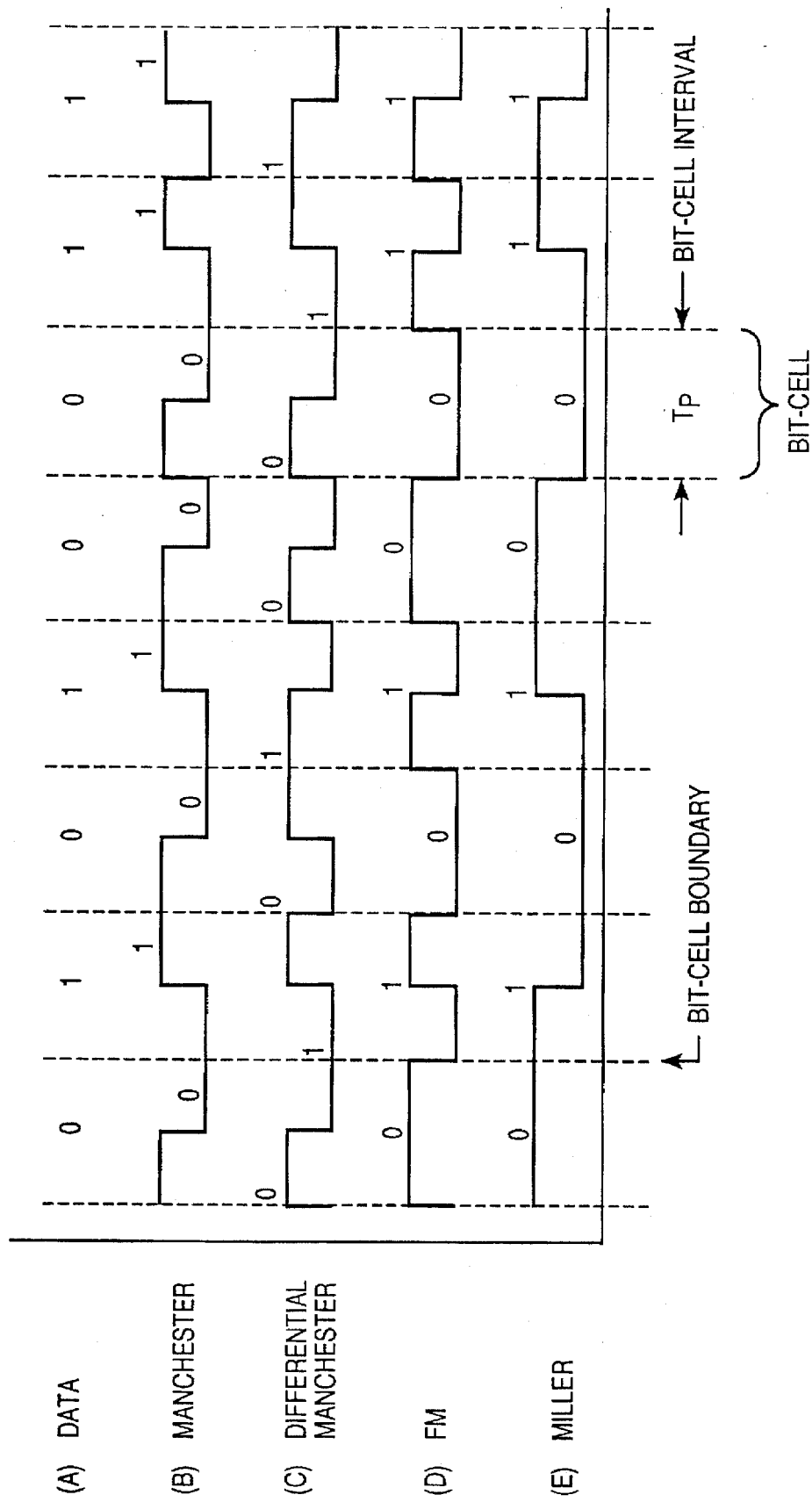
FIG_1

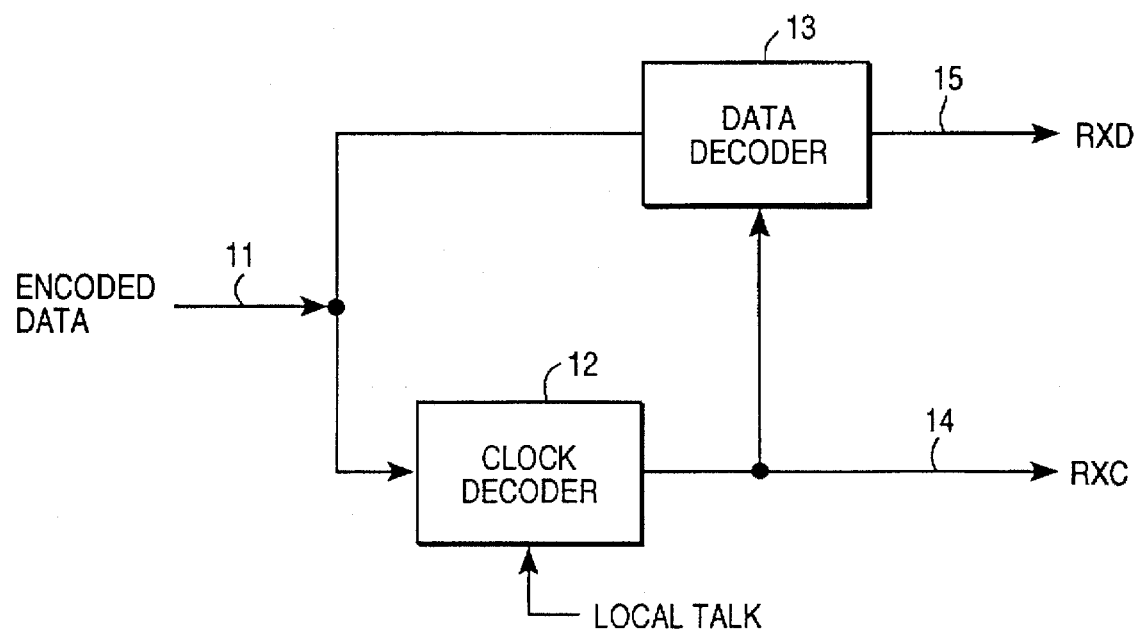
(PRIOR ART)
FIG_2

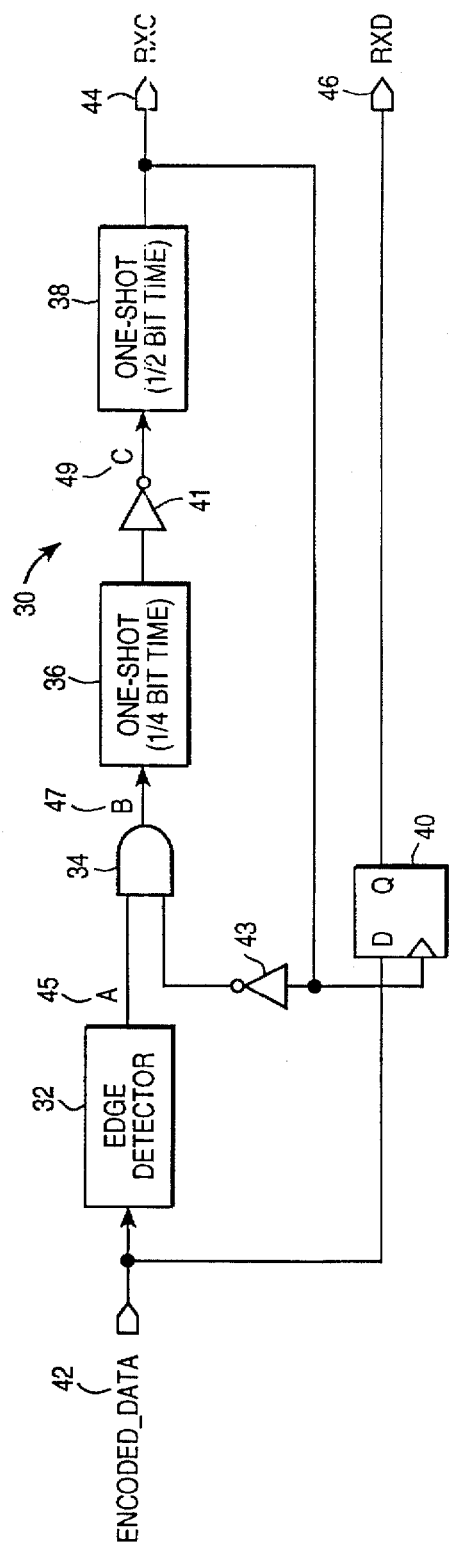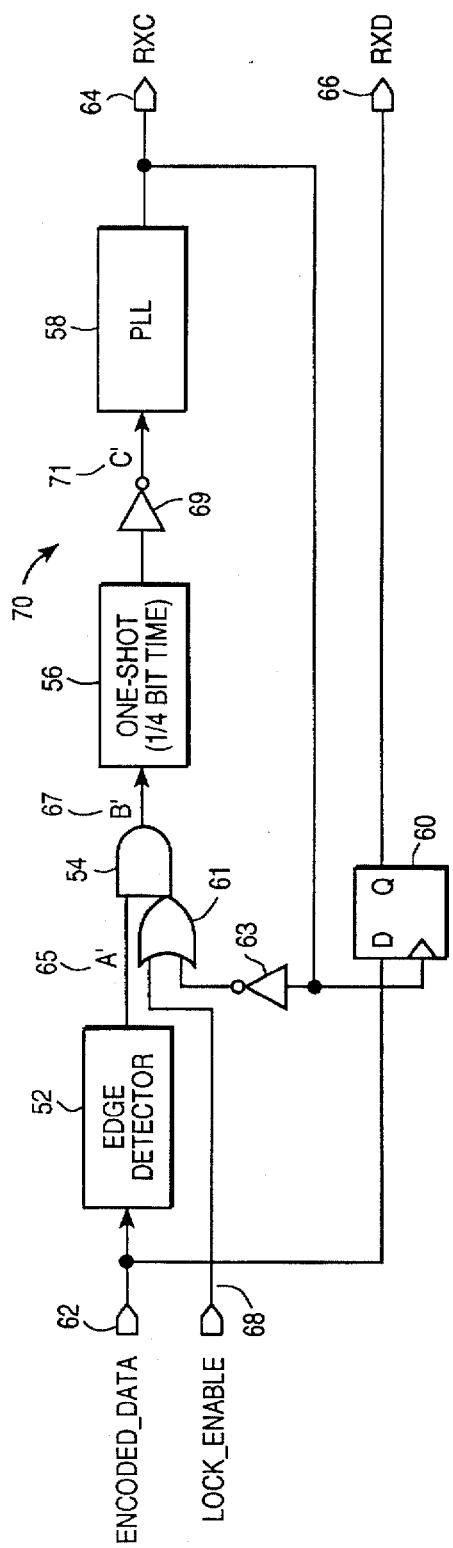

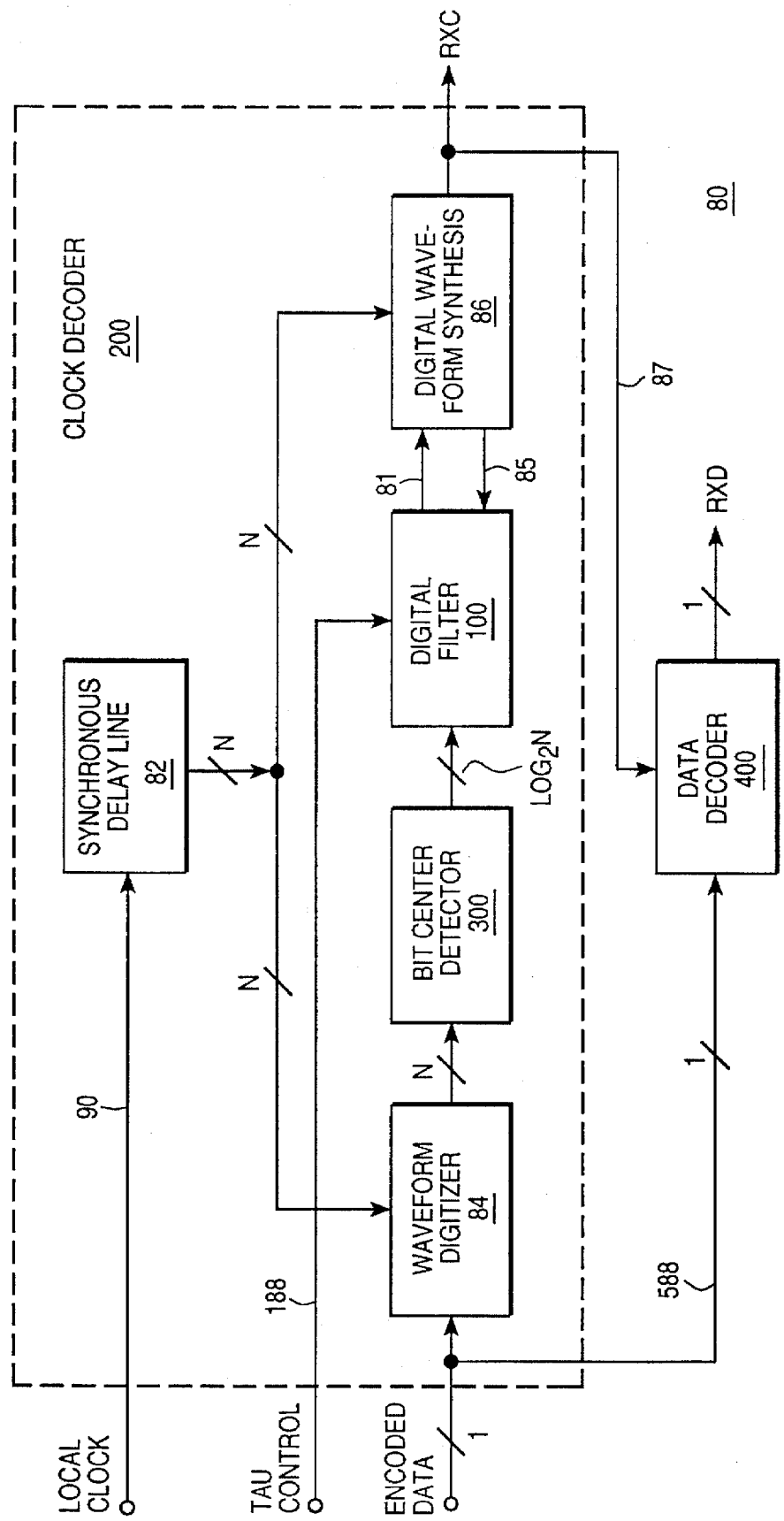
FIG_5 (PRIOR ART)

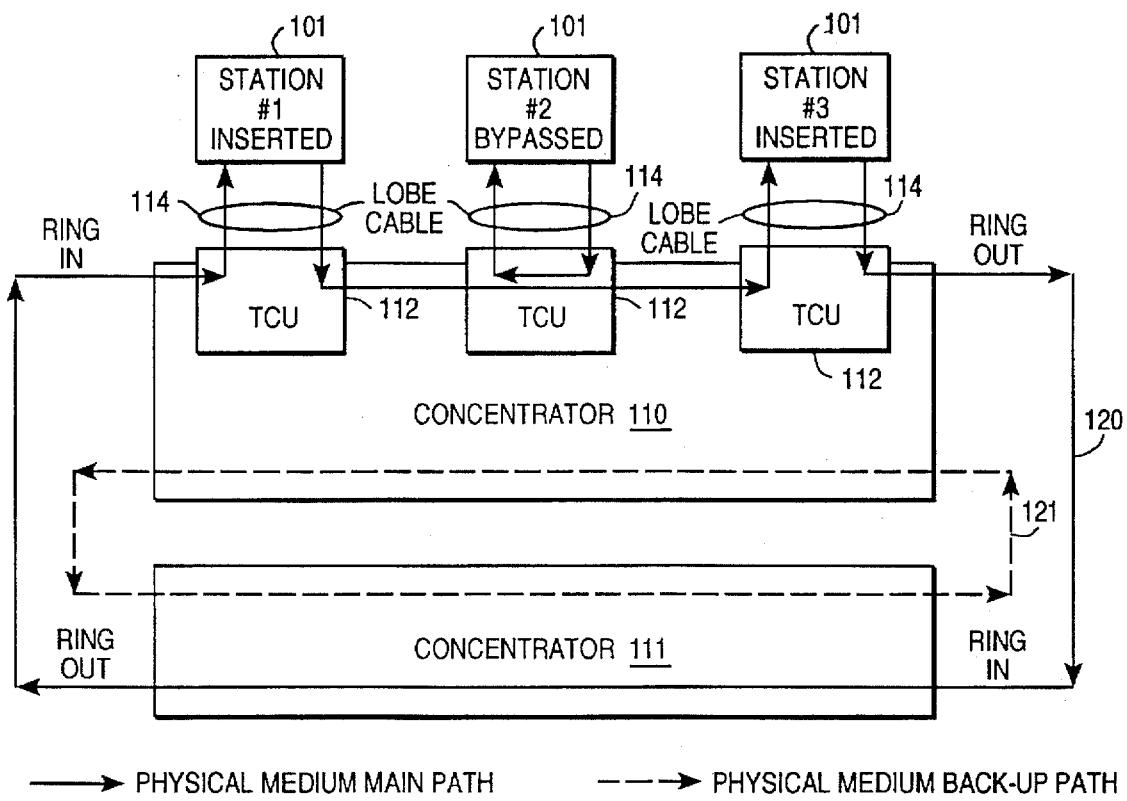
FIG_6 (PRIOR ART)
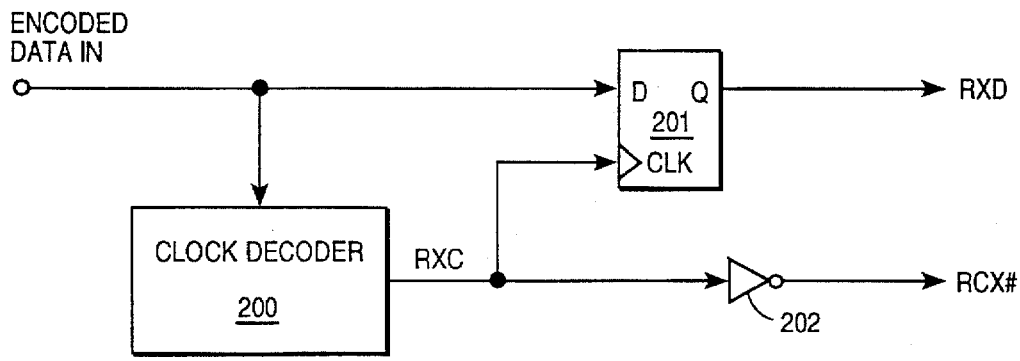
FIG_11 (PRIOR ART)

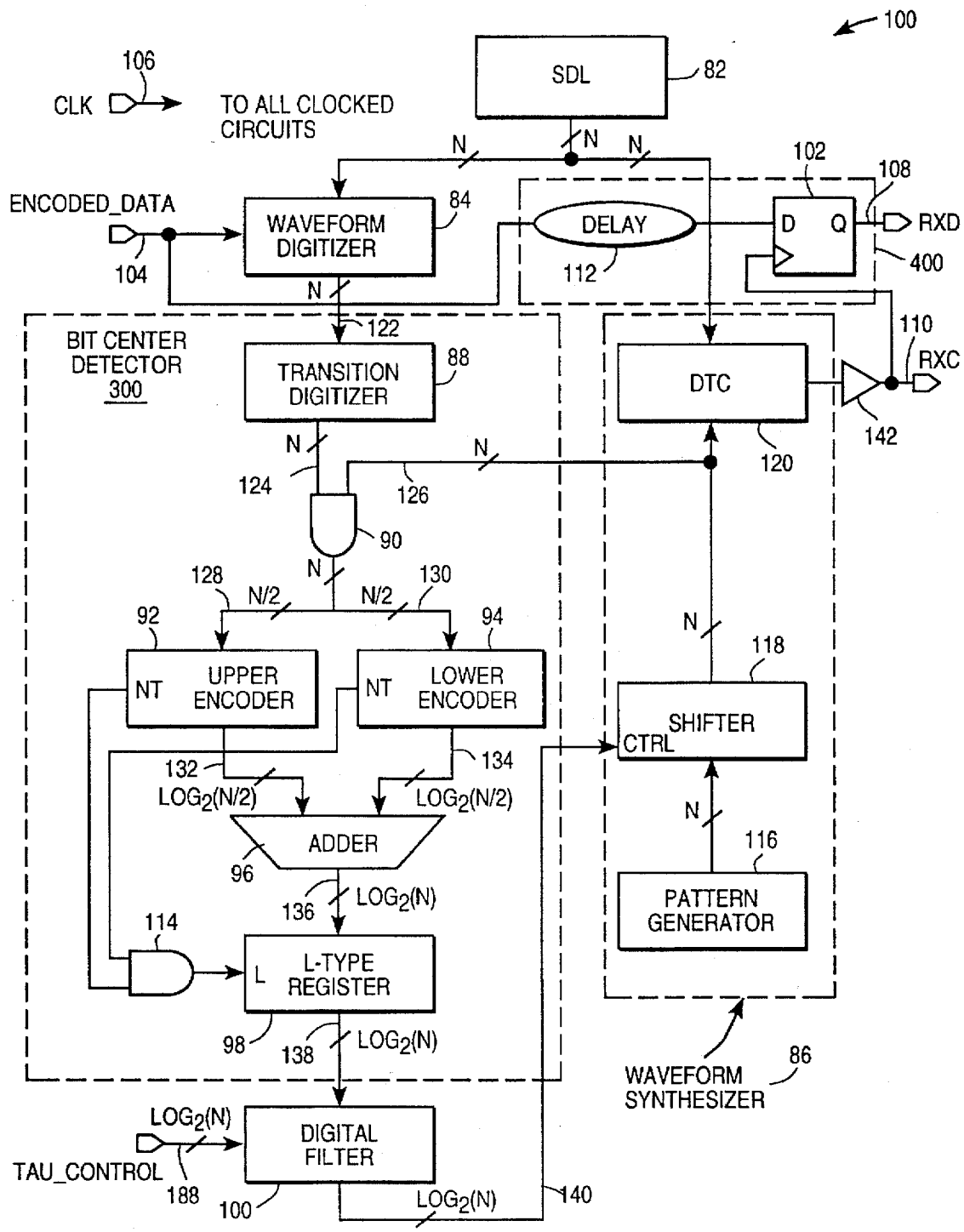
FIG_7 (PRIOR ART)

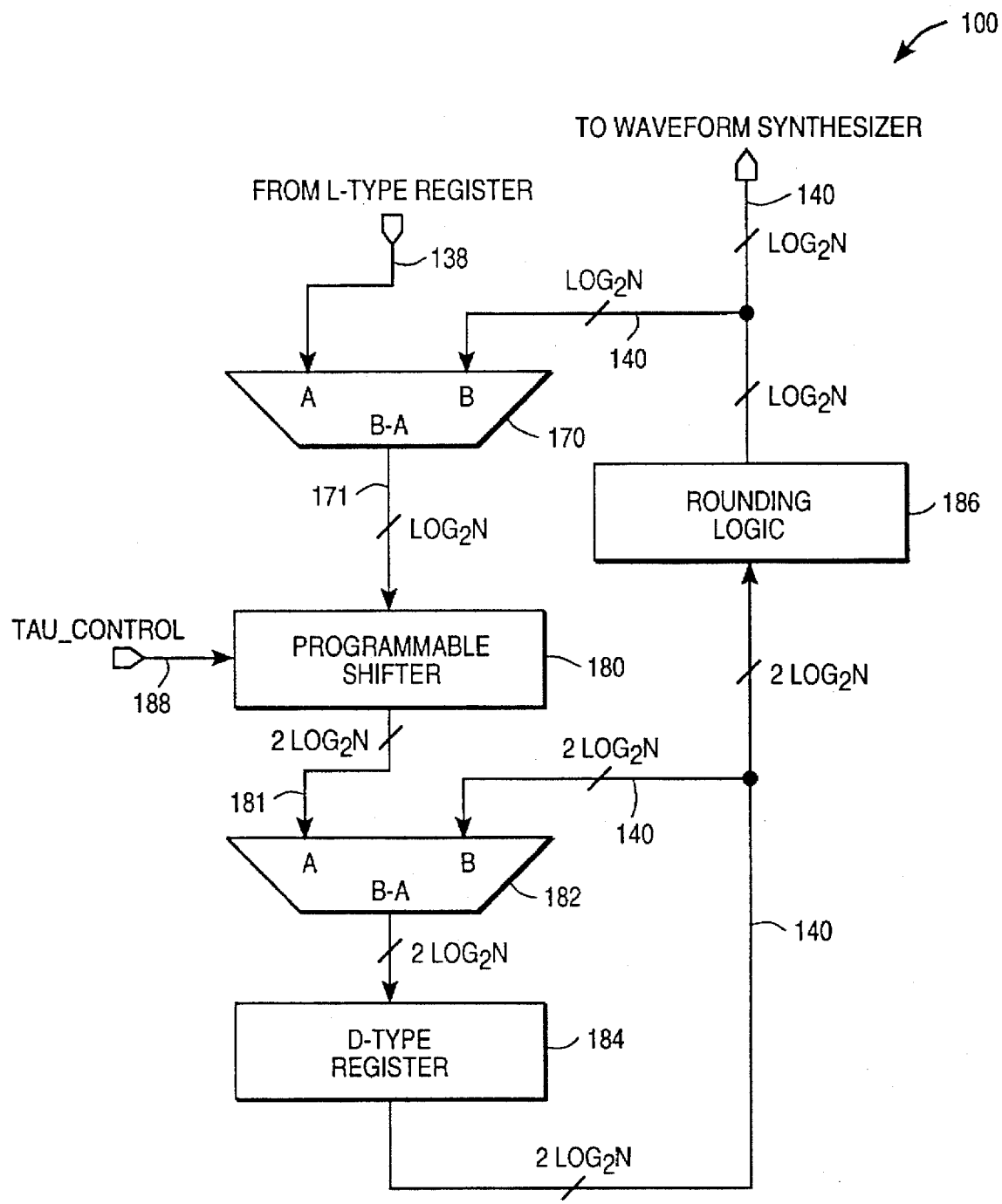
FIG_8 (PRIOR ART)

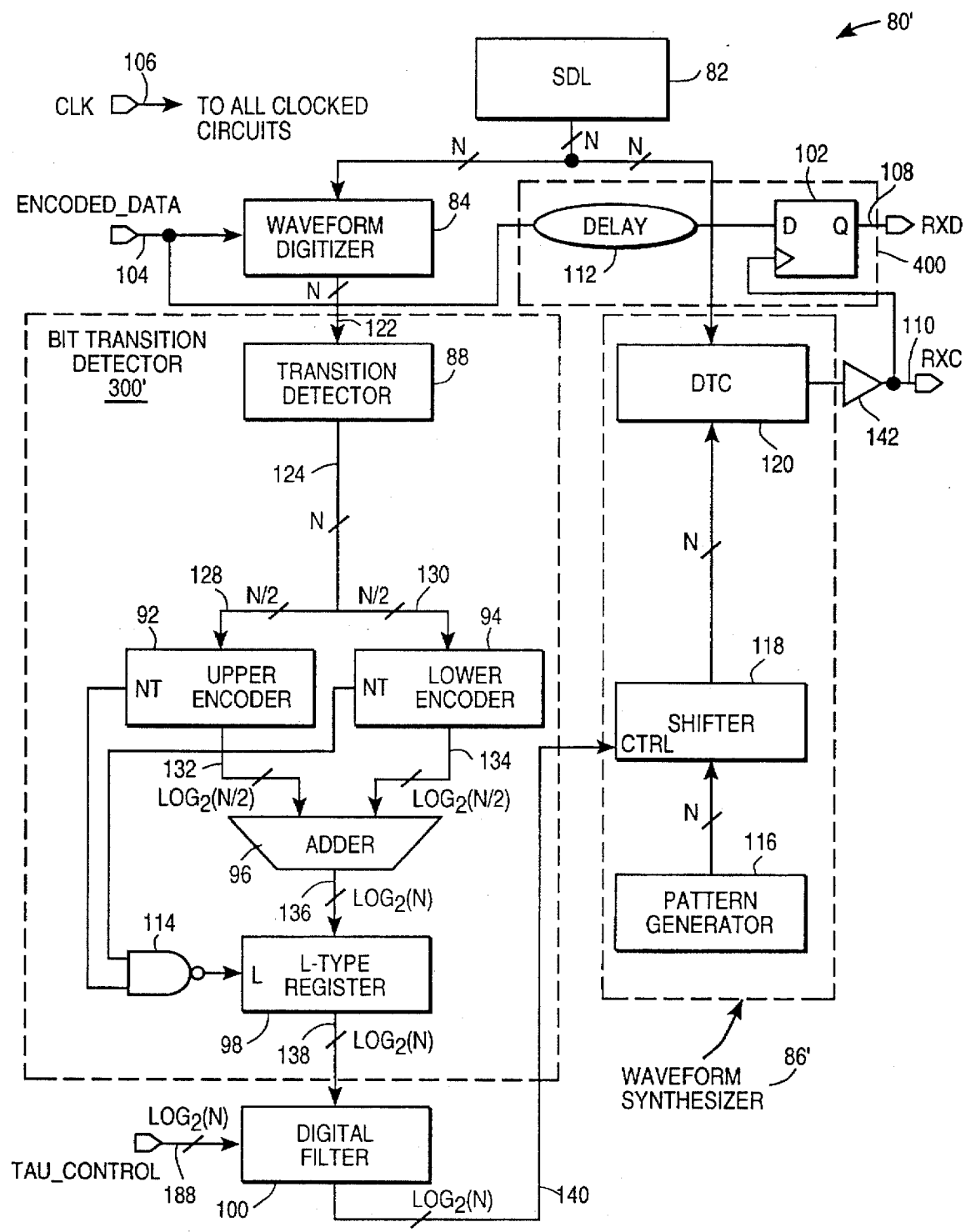
FIG_10

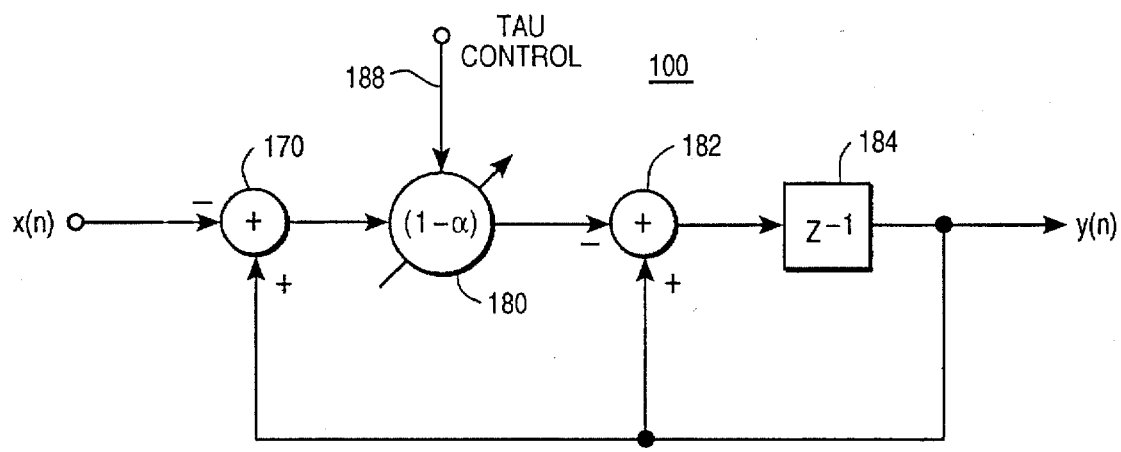
FIG_12 (PRIOR ART)
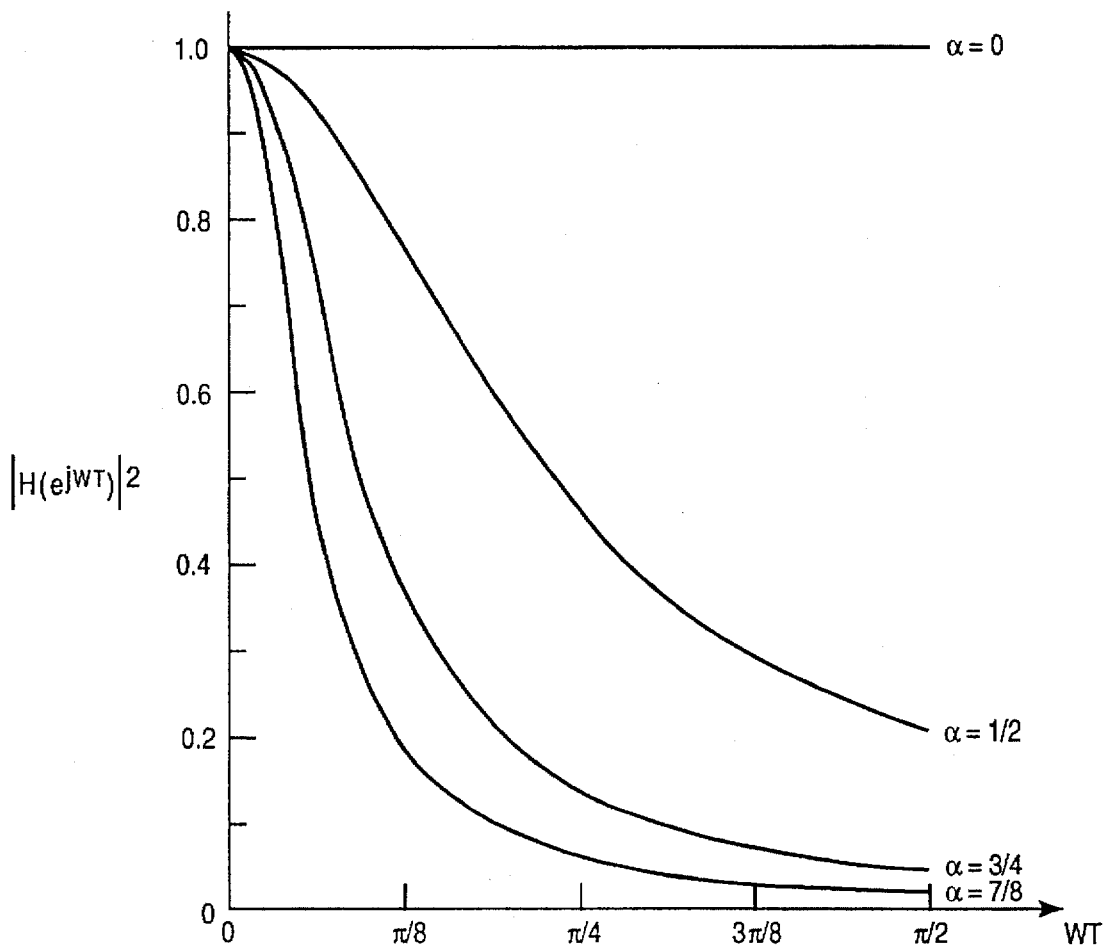
FIG_13 (PRIOR ART)

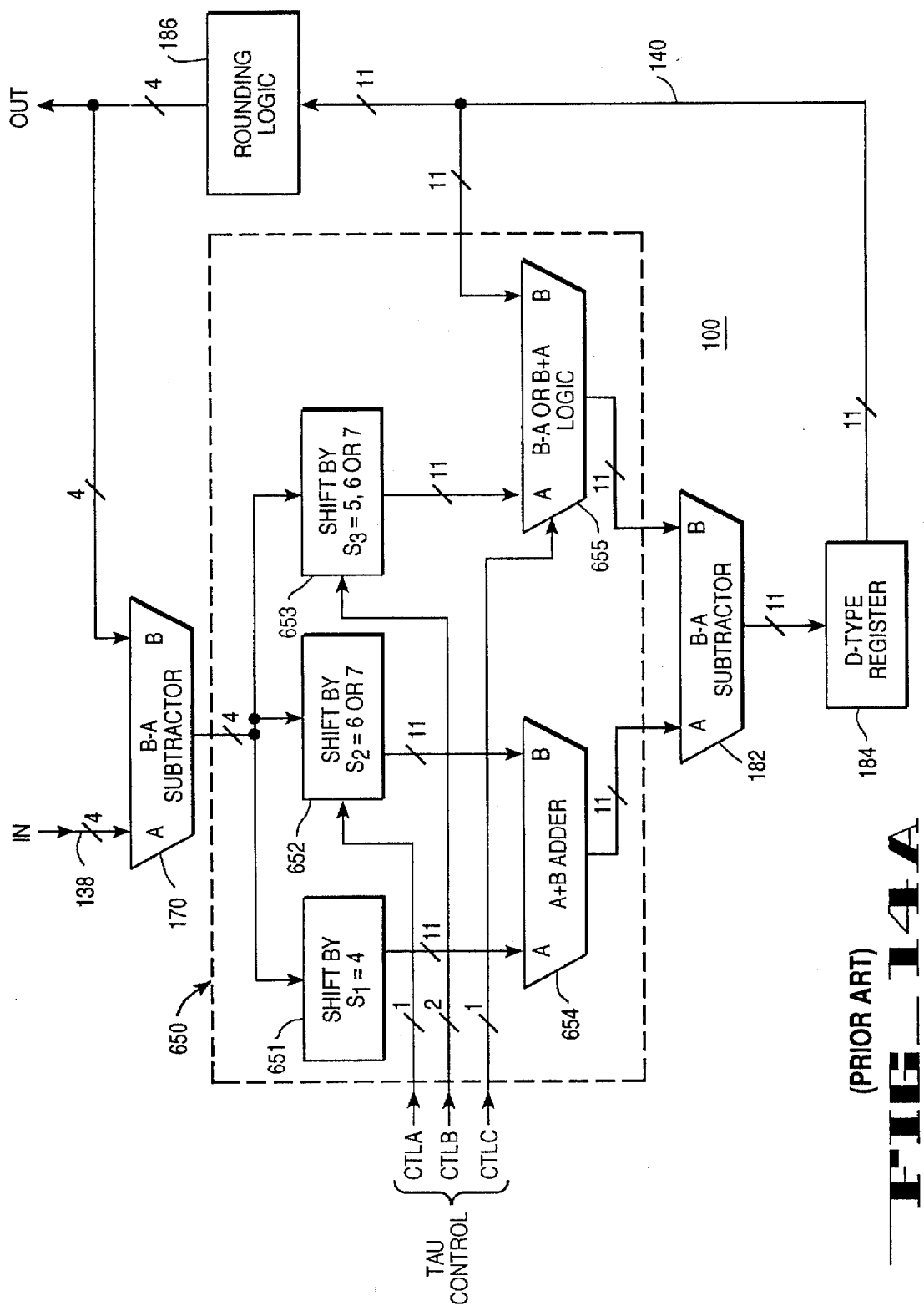
FIG_14A (PRIOR ART)

| β | CTLA | CTLB | CTLC | BANDWIDTH (KHz) | ΔBW(KHz) |
|---|---|---|---|---|---|
| $2^{-4} - 2^{-7} (= 2^{-4} + 2^{-7} - 2^{-6})$ | SH7 | SH6 | B+A | 286.4 | — |
| $2^{-4} (= 2^{-4} + 2^{-6} - 2^{-6})$ | SH6 | SH6 | B+A | 328.7 | 42.3 |
| $2^{-4} + 2^{-7} (= 2^{-4} + 2^{-6} - 2^{-7})$ | SH6 | SH7 | B+A | 371.3 | 42.6 |
| $2^{-4} + 2^{-6} (= 2^{-4} + 2^{-7} + 2^{-7})$ | SH7 | SH7 | B-A | 414.3 | 43.0 |
| $2^{-4} + 2^{-6}$ | SH6 | SH7 | B-A | 457.6 | 43.3 |
| $2^{-4} + 2^{-5} (= 2^{-4} + 2^{-6} + 2^{-6})$ | SH6 | SH6 | B-A | 501.4 | 43.8 |
| $2^{-4} + 2^{-5} + 2^{-7}$ | SH7 | SH5 | B-A | 545.4 | 44.0 |
| $2^{-4} + 2^{-5} + 2^{-6}$ | SH6 | SH5 | B-A | 589.9 | 44.5 |

FIG._14B (PRIOR ART)

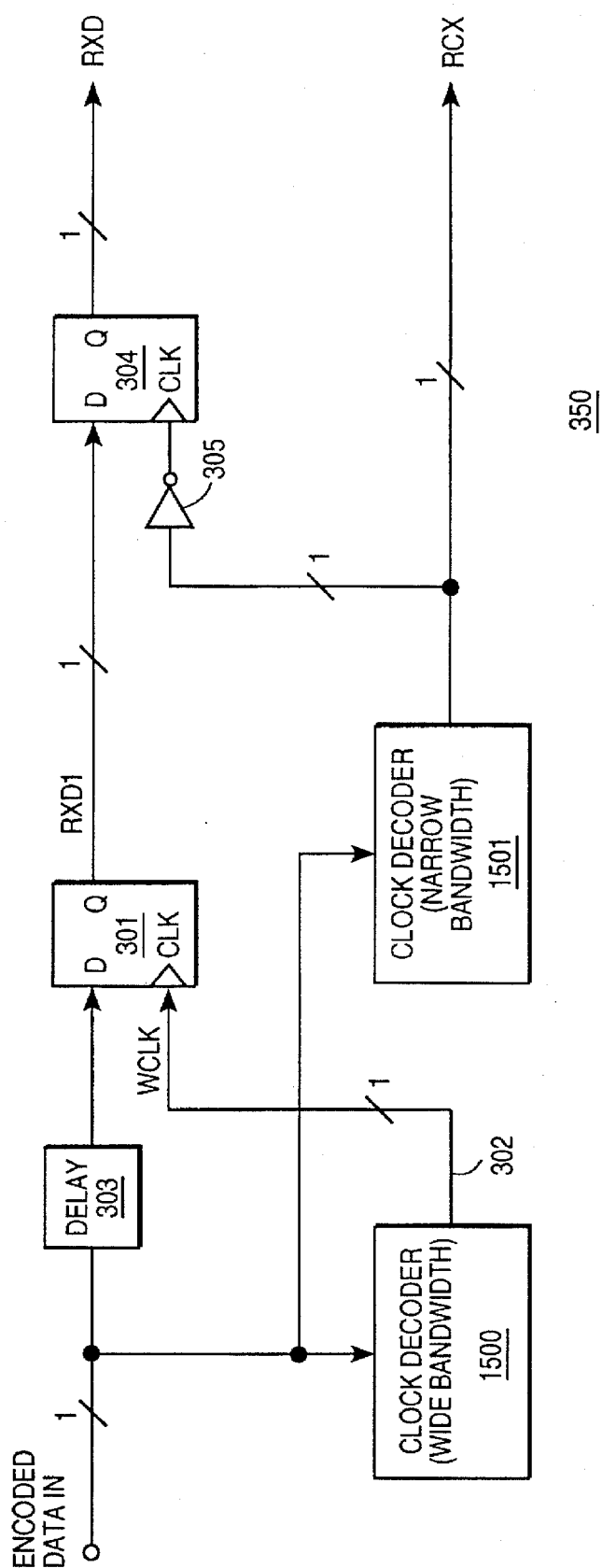
FIG_15

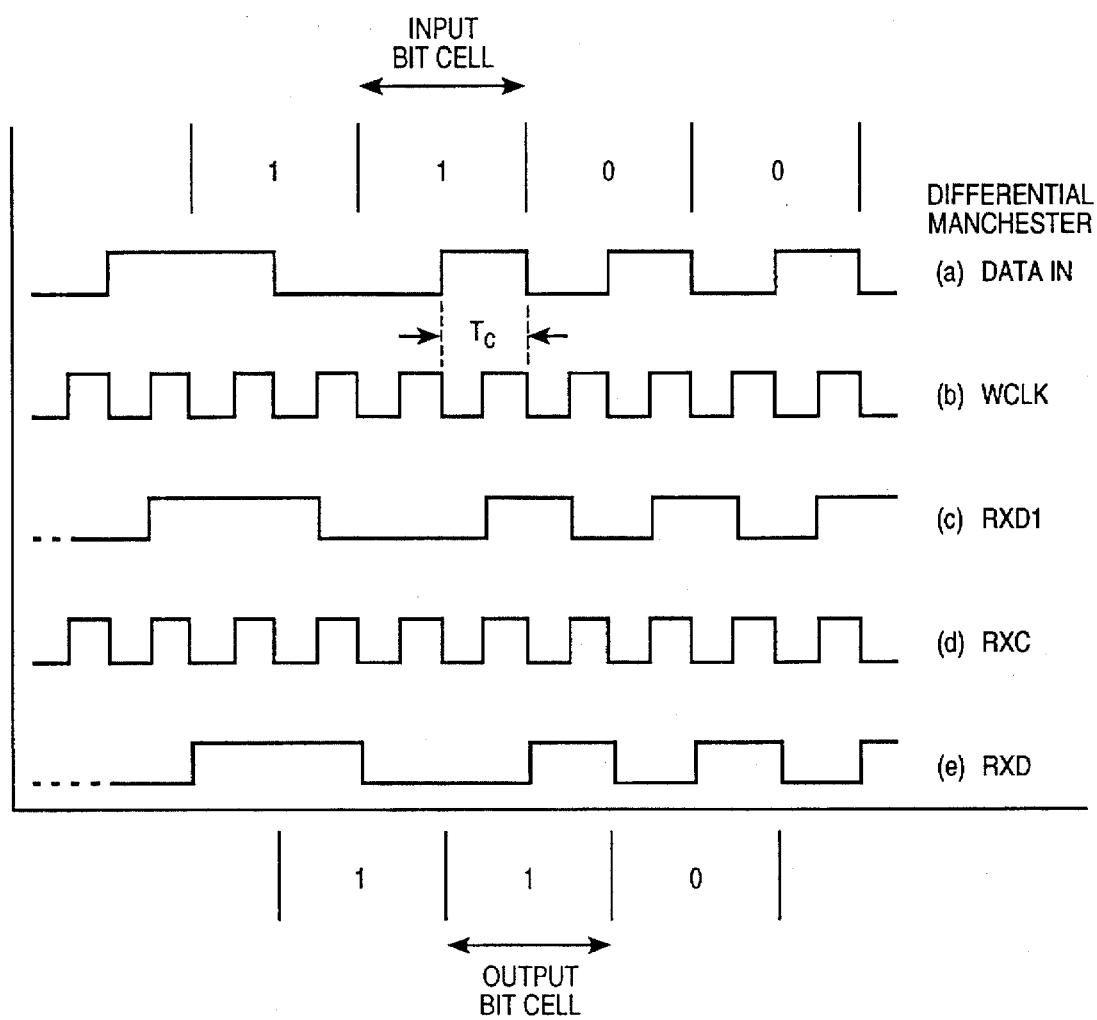
FIG_16

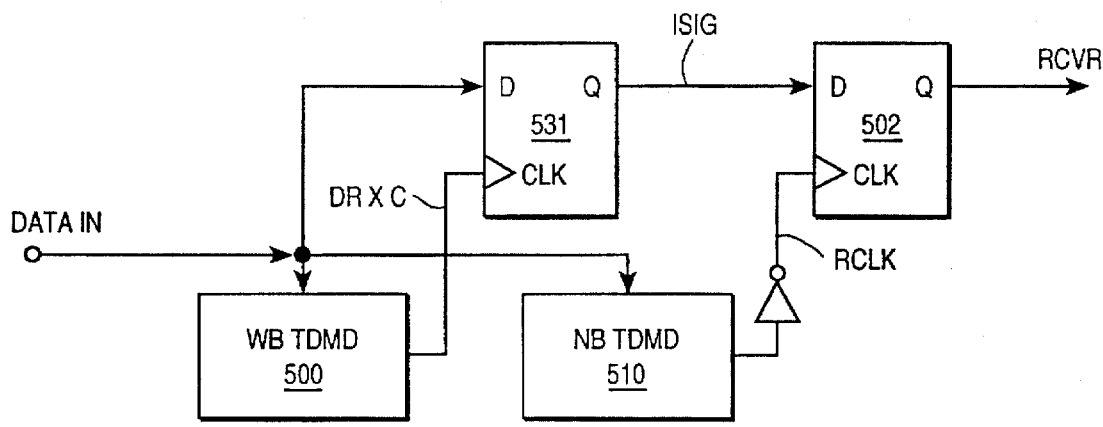
FIG_19
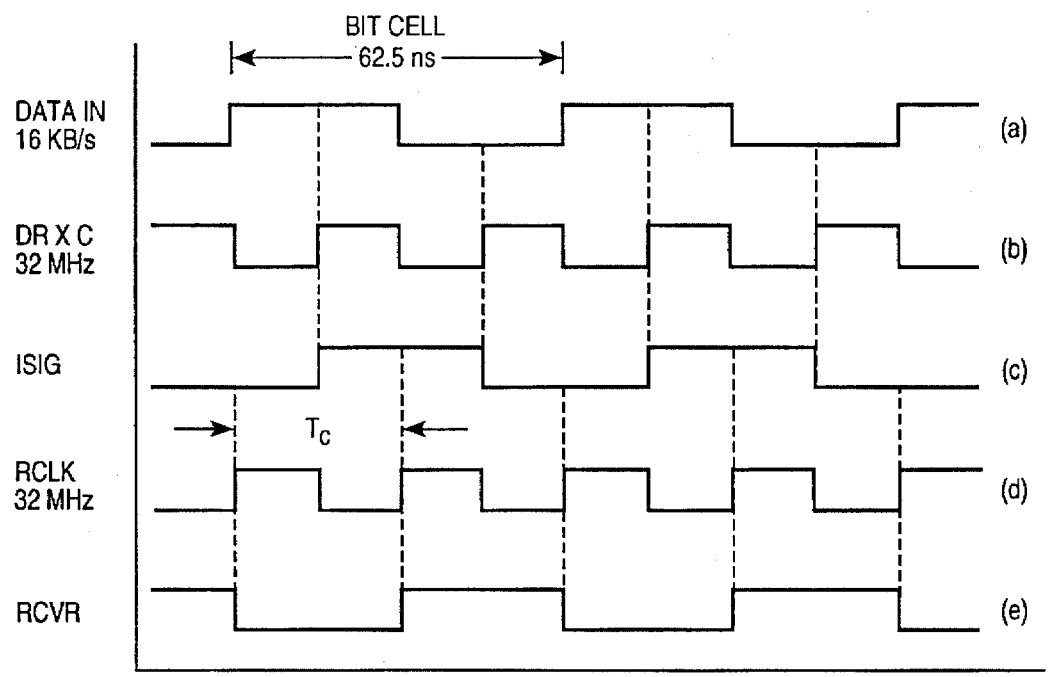
FIG_18

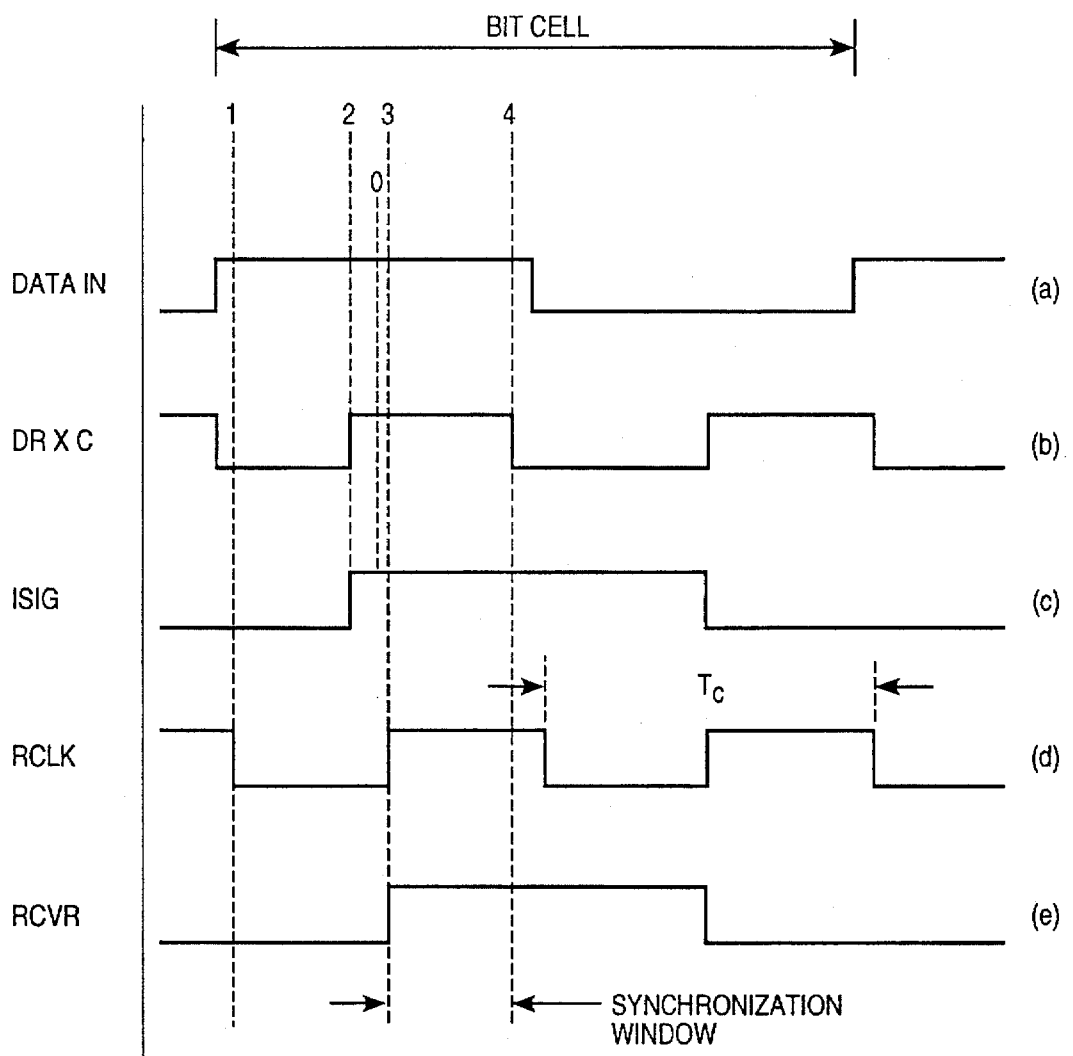
FIG_20

5,696,800

DUAL TRACKING DIFFERENTIAL MANCHESTER DECODER AND CLOCK RECOVERY CIRCUIT

FIELD OF THE INVENTION

This invention relates to the field of recovering clock and regenerating data information from a phase encoded binary signal, such as in a token ring local area network station. The decoder and clock recovering circuit is suitable for metal oxide semiconductor (MOS) and complementary metal oxide semiconductor (CMOS) implementation.

BACKGROUND OF THE INVENTION

Phase encoding techniques are employed for single transmission channel systems in which the clock for synchronous data detection at the receiver is combined with the data stream to produce a single transmitted signal. At the receiving station, the synchronous clock is extracted from the single transmitted signal and the clock is then used to synchronously decode the data.

FIG. 1 shows several examples of phase encoded signals corresponding to the un-encoded data in line (a), including: Manchester code, line (b), in which each bit-cell interval, Tp, is occupied by a doublet that switches from high-to-low or low-to-high at the bit-cell interval center (Tp/2), where the value of the doublet in the last half interval, Tp/2 to Tp, assumes the value of the corresponding data bit; Differential Manchester code, line (c), wherein each bit-cell interval, Tp, is occupied by a doublet and the value of the corresponding bit is indicated by the transition, or lack of transition, at each bit-cell boundary, with a boundary transition corresponding to an un-encoded zero (low logic level), and a lack of level transition corresponding to a one (high logic level); frequency modulation (FM) code, line (d), in which the unencoded bit is represented as doublet within a bit-cell if the corresponding bit is a one, and by a constant high or low level over the bit interval if the corresponding bit is a zero, the doublet initial value and the instant value chosen so that a transition occurs at every bit boundary; and Miller (or modified FM) code line (e), in which a constant low or high level over a bit interval corresponds tp a zero, and a doublet corresponds to a one, with the constant level state and the initial doublet level state determined by the final state of the previous encoded bit.

Both Manchester codes produce encoded signals with transitions at each bit interval centers and data dependent transitions at the bit boundaries. The FM and Miller codes produce data dependent transitions at each bit interval center. However, the FM code produces a transition at each bit boundary while the Miller code produces a bit boundary transition only between successive unencoded zeros.

Clearly, decoding of these codes requires observing (sampTing) the encoded waveforms during a proper time interval, in each bit interval, in order to determine the state of the encoded bit. For the Manchester code, recognizing the direction of the mid-bit-interval transition or the state of the doublet during the last half of the bit interval decodes the information. For the Differential Manchester code, data is decoded by detecting if a transition occurs at the bit boundary or by exclusive-ORing corresponding half bit-cell states of successive bit-cells. The FM and Miller codes are decoded by detecting if a center bit-cell transition occurs. Hence, the first step in decoding a phase-encoded signal is the extraction of the clock from the received signal because, given the clock signal, an appropriate control signal for observing the encoded waveform at periodic bit intervals, Tp, can be constructed by introducing a delay relative to the extracted clock transitions.

The prior art methods of decoding phase encoded binary signals is represented in FIG. 2. The phase encoded binary data signal is applied to input 11 which is connected to the input of the clock decoder 12 and data decoder 13. Clock decoder 12 operates with a local clock that is closely matched to the transmitter clock embedded in the phase encoded signal, accepts the input signal and operates on the state transitions of the input signal to produce at its output a signal, RXC, which is representative of the original transmitter clock embedded in the encoded data. The reconstructed clock signal, RXC, is used by data decoder 13 to extract the data from the phase encoded input signal. Data decoder 13 introduces any necessary relative delays between the input encoded signal and the reconstructed clock, RXC, and support logic to decode the data, RXD, at the output.

Prior art clock decoders may be categorized into three main types of decoders:

1) one-shot, 2) phase locked loop (PLL), and 3) tracking Manchester decoder (TMD).

A description of and references to the first two types may be found in Bazes, M., "CMOS Digital Clock and Data Recovery Circuit," U.S. Pat. No. 5,103,466, Apr. 7, 1992, which discloses, as the subject of the patent, a clock decoder of the third (TMD) type.

The one-shot clock decoder requires a signal transition to occur consistently within each bit interval such as generated by the Manchester, Differential Manchester, and FM binary phase codes. In the latter case, the FM code produces a state transition at each bit-cell boundary (FIG. 1(d)) while in the case of either Manchester codes (FIG. 1(b), (c)) a center bit-cell transition is produced in each bit interval. The Miller code (FIG. 1 (e)) does not produce consistent transitions within each bit-cell and hence is not suitable for one-shot detection.

One-shot clock detection is based on detecting the consistent set of transitions and masking out the inconsistent (data dependent) set of transitions. If the phase encoded binary signal is applied to an edge detector, that detects each state transition and outputs a pulse for each detected transition, a stream of periodic pulses results corresponding to the consistent set of transitions and a non-periodic (or almost periodic) set corresponding to the data dependent set. A mask can be applied to gate-out the non-periodic pulse set, which occur at known positions relative to the periodic set. The periodic set of pulses may be applied to a suitable waveform generator, such as a one-shot, to form a reconstructed clock signal, RXC, with appropriate duty cycle.

The clock, RXC, may then be applied to a data detector that is used to synchronously decode the input binary phase encoded signal in which the clock has a fixed relationship to the region within each bit-cell that contains the encoded data information, i.e., in the case of the Manchester code, in the state of the last half of the bit-cell; and for the FM clock, in the presence, or lack, of a center bit-cell transition.

If the binary phase encoded signal does not have a set of consistently periodic transitions, a more complicated clock extraction method is required that uses a set of quasi-periodic pulses to generate a periodic set of pulses representative of the transmitted clock. Commonly, a phase-locked-loop (PLL) is used for this purpose.

FIG. 3 shows a one-shot clock decoder that includes an edge detector 32 operating on the binary input signal and generating a pulse for each signal state transition, AND-gate 34 for gating out bit-cell boundary transitions and passing center bit-cell transitions to one shots 36 and 38, and inverter 49 for clock waveform generation which is output at terminal 44 as RXC and fed back to AND-gate 34 through inverter 43. D-type flip-flop 40 constitutes a simple data decoder, or sampling circuit, that samples the encoded data 42 at the rising edge of RXC to produce the decoded data signal RXD 46.

FIG. 4 shows a PLL type of clock decoder that is similar to the one-shot clock decoder of FIG. 3 except that a one-shot has been replaced by PLL 58 which synthesizes a periodic clock, RXC, from the set of state transitions selected by AND-gate 54 that functions as a periodic time window. OR-gate 61 is required in order to ensure proper initialization (start-up) by temporarily disabling AND-gate and allowing all transitions to pass through. Again, the data decoder is a simple D-type flip-flop sampling circuit (60) that samples encoded 62 at the appropriate time by using RXC as the clock input and produces the decoded data, RXD, at the Q output. The PLL clock decoder has the advantage of being able to track slow changes in the received clock rate.

Both the one-shot and the PLL clock decoders incorporate analog type circuitry which is difficult to manufacture in MOS or CMOS because of the large variability in these manufacturing technologies. Also, use of a one-shot decoder is undesirable when the incoming signal jitter needs to be filtered. Consequently, Bazes in U.S. Pat. No. 5,103,466 has disclosed a clock and data decoder that is suitable for manufacturing as MOS circuits.

FIG. 5 shows a simplified block diagram of the digitally implemented tracking Manchester clock and data decoder of Bazes. Clock decoder 200 includes waveform digitizer 84, that accepts the phase encoded waveform on line 588 and samples the state of the encoded waveform a number of times, N, (typically N=16 or 32, samples per bit-cell interval) and produces a binary output signal representative of the two states. The sampling control is provided by synchronous delay line (SDL) 82 that accepts the stable local clock (which has a rate close to the phase encoded clock rate) and produces a time varying output on the N output taps. (SDL 82 is described by Bazes in U.S. Pat. No. 4,994,695 entitled "Synchronous Delay Line with Quadrature Phases.") The advance through the taps of the clock transition is used to sample, in parallel, each bit-cell interval N-times per bit-cell interval, producing a high resolution digital representation of the incoming phase encoded waveform.

The output from waveform digitizer 84 is an N sample representation of a bit interval of the phase encoded input data that is supplied to bit center detector 300. (Waveform digitizer 84 is described by Bazes in U.S. Pat. No. 4,975,702 for "CMOS Waveform Digitizer.") Bit center detector 300 tracks the bit center transitions. Digital filter 100 is a low-pass single-pole filter that accepts the bit center detector output, a binary number representing the bit center location, and computes a bit center location average value which is used to control, by line 81, the phase of the synthesized clock signal, RXC, produced by digital waveform synthesizer 86. Digital waveform synthesizer 86 also supplies the masking control signal, over line 85, to bit center detector 300. (Digital waveform synthesizer 86 is described by Bazes in U.S. Pat. No. 4,980,585 entitled "Method and Apparatus for Synthesizing Digital Waveform.")

Data decoder 400 includes a delay for properly matching the sampling of the encoded data on line 588 by the reconstructed clock, RXC, supplied on line 87. A D-type flip-flop sampling circuit is used for sampling by RXC.

In this manner, the tracking Manchester decoder of Bazes, provides the benefits of dynamically tracking the clock embedded in the phase encoded signal using an all digital implementation suitable for MOS manufacturing technology.

An important application for the present invention is in token-ring local area network (LAN) stations. FIG. 6 is a simplified block diagram of a token-ring LAN that consists of a star connected system of stations 101, each station connected by a lobe cable 114 to a concentrator 110 or 111 by means of a trunk coupling unit (TCU) 112,. Concentrators are serially interconnected by the main ring communication path 120 and the back-up ring path 121. Each TCU 112 provides means for inserting a station into the communication path or for connecting back to itself in the by-passed mode. A maximum of 250 stations per token-ring can be accommodated.

Information on the token-ring is transferred sequentially, bit-by-bit, from one inserted station to the next so that, for example, station no. 1 would transmit to station no. 3 and station no. 3 would transmit to station no. 1. Each station regenerates and repeats each bit. A station transfers information into the ring where the information circulates from one station to the next. The destination station copies the information as it passes through. The source station that originated the information message strips the information from the ring.

The signaling method employed in the Token-Ring LAN is Differential Manchester, as previously described. One station, the Active Monitor, provides a fixed frequency, crystal controlled, reference clock for clocking messages originating within any Token-Ring station. The other stations on the Token-Ring derive the output timing from the received data message by recovering the originating station's embedded clock decoding the message and regenerating the message before passing the message onto the next station. The elastic buffer, situated at the Active Monitor, compensates for jitter and dynamic latency variations in the Token-Ring. If the elastic buffer elasticity is exceeded by underflow, or overflow, an error condition exists that requires re-initialization. For this reason, it is important that the decoding and regeneration process introduce a minimum amount of jitter because the repeated decoding and regeneration accumulates phase jitter as the message travels around the Token-Ring LAN.

SUMMARY AND OBJECTS OF THE INVENTION

A dual tracking Differential Manchester decoder (TDMD) improves jitter tolerance while keeping the accumulated jitter to a minimum by using two decoder circuits: one for recovering the data, and a second for recovering the clock, each recovery circuit respectively optimized for recovery of the data and the clock.

The TDMD provides a decoding and clock recovery circuit that is tolerant to incoming phase jitter while minimizing the accumulation of phase jitter when regenerating the data in a Token-Ring LAN station and also provides an improved clock recovery and decoding circuit by using digital circuits that are implementable using metal-oxide-silicon (MOS) and complementary MOS (CMOS) technology.

BRIEF DESCRIPTION OF THE DRAWINGS

The present invention is illustrated by way of example and not limited to the figures of the accompanying drawings, in which like labels indicate similar elements.

FIG. 1 is a set of examples of phase encoded binary signals having embedded clocks.

FIG. 2 is a simple block diagram of a clock and data decoder suitable for decoding the phase encoded binary signals.

FIG. 3 is a block diagram of a prior art one-shot decoder.

FIG. 4 is a block diagram of a prior art phase-locked-loop (PLL) decoder.

FIG. 5 is a simplified block diagram of a Bazes type TMD phase encoded clock and data decoder.

FIG. 6 is a block diagram of a typical Token Ring network.

FIG. 7 is a detailed block diagram of a Bazes type tracking Manchester decoder (TMD).

FIG. 8 is a block diagram of a single-pole digital filter.

FIG. 9($b$) is a detail of a DTC switch.

FIG. 10 shows a detailed TDMD block diagram.

FIG. 11 shows a simplified TDMD clock and data recovery unit.

FIG. 12 is an idealized low-pass single-pole digital filter.

FIG. 13 shows the magnitude-squared frequency response of the digital filter.

FIG. 14($a$) shows a block diagram for a programmable low-pass single-pole filter.

FIG. 14($b$) is a tabulation of control signals and bandwidth of the filter of FIG. 14($a$).

FIG. 15 is a block diagram of a dual TDMD system for clock and data regeneration.

FIG. 16 shows the idealized waveforms associated with the dual TDMD.

FIG. 18 shows a set of idealized waveforms associated with reconstructing a Differential Manchester encoded signal for retransmission.

FIG. 19 shows a dual TDMD system adapted to decoding Differential Manchester encoded signals.

FIG. 20 shows a set of waveforms associated with reconstructing a Differential Manchester encoded signal.

DETAILED DESCRIPTION

A. Overview

Figures 9A, 9B:
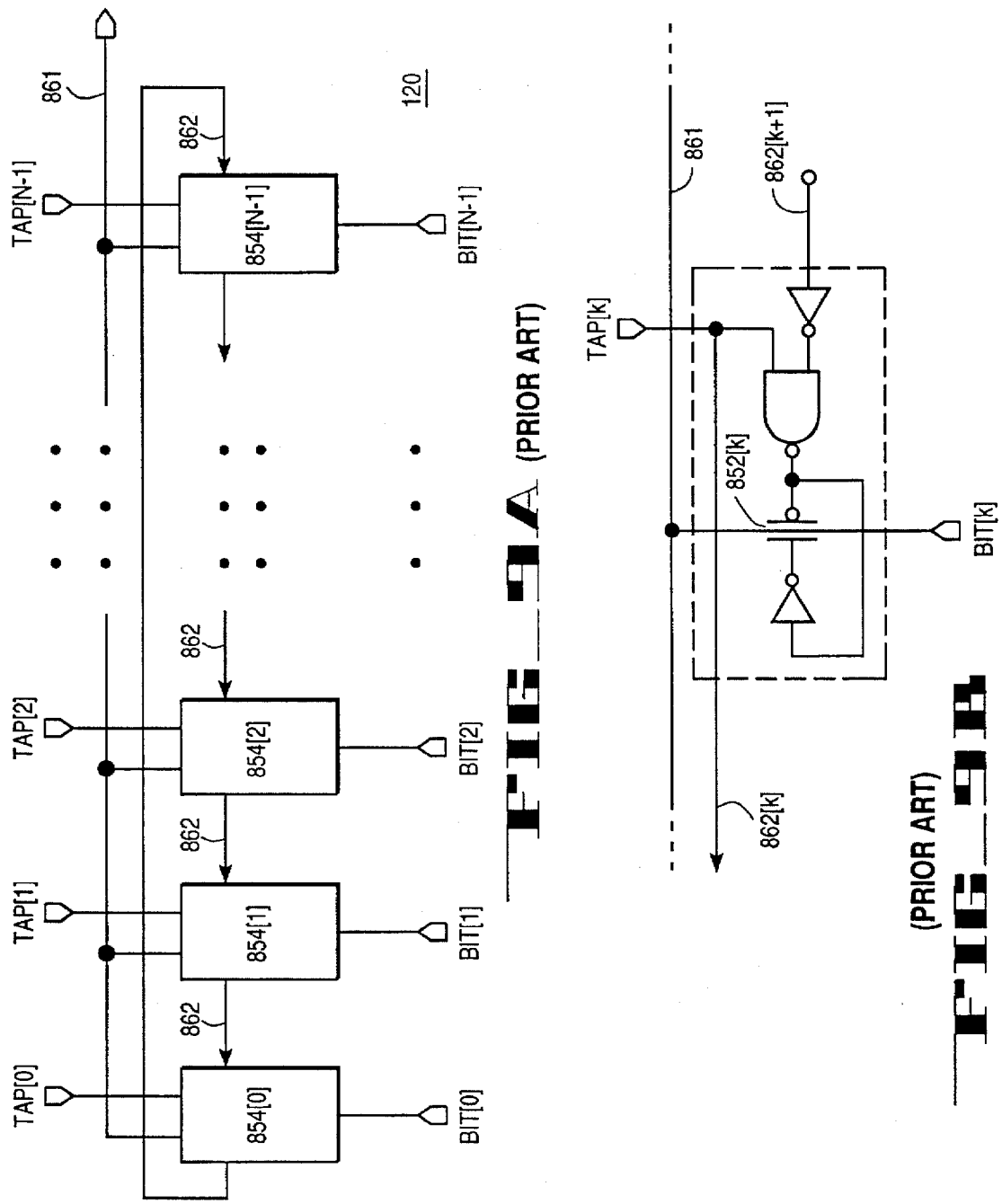
FIG. 9($a$) is a block diagram of a digital-to-time domain converter (DTC) waveform generator.

In a token-ring station, the recovered clock is used for both decoding the input data stream and for transmitting the data to the next station. The recovered clock is used to determine the proper phase location at which to sample the data stream for recovery of the encoded data.

The clock recovery circuit must respond quickly to the incoming serial data stream in order to use it for decoding the data. The requirement for fast response implies that any filter used to recover the clock must have relatively large bandwidth. However, the need for minimizing jitter in the signal transferred to the next station requires that the recovered clock be as free as possible of noise and jitter which implies the use of a narrow band filter in the recovery of the clock.

The prior art solutions to the clock and data recovery problem have accommodated the conflicting filter requirements by using a sub-optimal filter with a compromise bandwidth between the two optimal choices. For example, PLL type clock decoder of FIG. 4 uses a single filter in the PLL, that has sufficient bandwidth to ensure timely data recovery response (RXD) while compromising the purity of the recovered clock (RXC). Neither the requirement for fast data recovery, nor the requirement for a stable recovered clock, are fully satisfied.

The tracking Manchester decoder (TMD) of Bazes (U.S. Pat. No. 5,163,466) is an all digital approach for clock recovery that uses a 32 tap synchronous delay line (SDL) to provide a timing reference. The incoming data is sampled at every tap (1/32 of the clock period) into a 32-bit (or 16-bit) pattern, corresponding to a sample each 1.953 ns (or 3.906 ns). The pattern is processed and filtered digitally to extract the phase of the input-data with respect to the imbedded clock. This phase information is used to recover the imbedded clock and to sample the encoded message stream for data recovery.

FIG. 7 is a detailed block diagram of the tracking Manchester decoder (TMD) 80 as taught by Bazes in U.S. Pat. No. 5,103,466 for clock and data information recovery. TMD 80 comprises a synchronous delay line (SDL) 82 coupled to and controlling waveform digitizer 84 that accepts encoded input data on input line 104 and outputs a binary valued representation of the input encoded data sampled N times per clock period with sequential samples appearing simultaneously on N distinct lines 122 that are connected to the input of transition detector 88. The state of lines 122 corresponds to the logic state of a one clock interval of the input encoded waveform at the sampled points. Transition detector 88 comprises a plurality of N two-input exclusive-OR (XOR) gates (N=16, typically). The $n^{th}$ XOR-gate inputs are connected to the (n−1)th and $n^{th}$ lines of lines 122, except for the zero$^{th}$ XOR-gate that has one input connected to the zero$^{th}$ line and the other connected to a flip-flop that stores the state of line N one clock period earlier. In this manner transition detector activates an output line (1-out-of-N) corresponding to the XOR-gate that senses a 0,1 or 1,0 input that indicates a state transition. Such a transition may occur at a bit-cell center or bit-cell boundary.

The N output lines 124 of transition detector 88 are applied to AND stage 90 that is used to mask out selected groups of bits by means of the N control lines 126 provided by waveform synthesizer 86 to N AND-gates, one gate per input line 124. The inconsistent and data dependent bit-cell boundary transitions are masked out, leaving only the consistent set of bit-cell center transitions that occur within ±¼ bit-cell of the bit-cell center.

The output of N lines from AND stage 90 is split into two groups of N/2 adjacent lines, one corresponding to the lower and the other to the upper half-set of lines. Each group of N/2 lines is applied to a corresponding lower encoder 94 or upper encoder 92 that detects an active line and produces a binary number corresponding to the active line position index (0–(N/2–1)). Upper encoder 92 also adds the value N/2 to the encoded line position index when a 1 is detected on one of the upper N/2 lines to indicate the true position relative to the lower N/2 lines. The output of each encoder, lines 132 and 134, are added in adder 96 for producing an average (mod N) value for the transition whenever two transitions occur within a half clock period interval due to jitter. The adder output is latched into L-type register 98. If no transitions are detected by either encoder 92 or 94, a NT (no transition) signal is generated (high) and applied to NAND-gate 114. If both inputs to NAND-gate 114 are high, indicating no transitions detected, the output connected to the L input is deasserted causing the register not to accept the output of adder 96. Thus, the previous value is retained at output lines 138. The output of register 98 is a sequence of numbers, each indicating an estimated position of the bit-cell center transition during each clock period.

The output of register 98 is applied to digital filter 100, a low-pass single-pole filter, for producing a smoothed (or moving average) estimate of the bit-cell center transition on output line 140.

FIG. 8, a block diagram of filter 100, shows an input line 138 from register 98 into subtractor unit 170 input A and the filter output on line 140 connected to input B for forming the difference y(n)–x(n) at output 171, where y(n) is the $n^{th}$ value of the filter output on line 140 and x(n) is the $n^{th}$ input value supplied by register 98. Binary scaling ($2^{-s}$), where s is the number of right bit shifts applied by TAU control line 188, is applied to the value at line 171 by programmable shifter 180 for controlling the bandwidth of filter 100. The binary scaled output on line 181 is combined with the filter output at subtractor unit 182 to produce a value, $(1-2^{-s})y(n)$ $+2^{-s}x(n)$, equal to the difference between the output of shifter 180 and the filter output on line 140. The output of subtractor 182 is stored in D-type register 184 for one clock delay and then fed-back to subtractor units 170 and 182 and to the filter output line 140. Rounding logic unit 186 is for reducing the number of bits ($2\log_2 N$) out of the filter to $\log_2 N$ bits. The output from filter 100 can be represented as a difference equation relating the current output, y(n), to past input and output x(n–1) and y(n–1), or $$y(n)=(1-2^{-s})y(n-1)+2^{-s}x(n-1) \tag{1}$$

which has a corresponding z-transform equation $$Y(z)=2^{-s}z^{-1}X(z)/(1-(1-2^{-s})z^{-1}). \tag{2}$$

Therefore, the z-transform transfer function is $$H(z)=Y(z)/X(z)=2^{-s}z^{-1}/(1-(1-2^{-s})z^{-1}) \tag{3}$$

which is characteristic of a single-pole low-pass filter with a pole located at $z=(1-2^{-s})$.

Referring back to FIG. 7, digital filter output line 140 delivers the moving average (filtered) value of the bit-cell center (a $\log_2 N$ bit number) to shifter unit 118 of waveform synthesizer 86.

Waveform synthesizer 86 comprises pattern generator 116, shifter 118 and digital to time converter (DTC) 120. Pattern generator produces a binary pattern with N/2 centered 1's and N/4 0's on either side. The pattern is supplied to shifter 118 where the pattern is circularly shifted in accordance with the output of digital filter 100. If the output line 140 indicates that the detected clock is at bit-cell center, no shift is introduced. Otherwise, the pattern is rotated left so that the pattern is centered about the indicated clock position provided on the digital filter output line 140. The rotated pattern is applied to AND stage 90 where it masks-off all positions in the pattern delivered by transition detector 88 that correspond to 0's in the shifter 118 output pattern. In this way, bit-cell boundary transitions are removed and bit-cell center transitions are preserved.

The output pattern of shifter 118 is also provided as an input to DTC 120 together with the output of SDL 82. DTC 120 is shown in FIG. 9(a) and (b) and is described in detail by Bazes, U.S. Pat. No. 4,980,585. DTC 120 receives tap waveforms TAP[0:N–1] from SDL 82 and waveform BIT [0:N–1] from shifter 118. Also, N transition gates 854[0:N–1] for selectively connecting any one of the BIT[0:N–1] waveforms to a commonly connected output line 861 are controlled by waveforms TAP[0:N–1]. When a transmission gate 854[k] is turned on, it transfers the bit pattern on TAP[k] to output line 861, otherwise TAP[k] is isolated from output line 861. Also, transmission gate 854[k] is turned on only if TAP[k] is high and TAP[k+1] is low. Only one transmission gate 854 is turned on at a time. Because of the repeated scanning pattern produced by SDL 82 at TAP[0:N–1], the bit pattern out of shifter 118 is generated as a synthesized clock waveform that changes from one clock period to the next in accordance with the shifted pattern produced by shifter 118. The DTC 120 output is buffered by buffer 142 to produce the regenerated output clock RXC.

FIG. 9(b) shows the detail structure of transition gate 854[k]. TAP[k] and output signal (TAP[k+1]), on line 8629k+1] from the next adjacent transition gate, control switch 852[k] as explained above.

In order to cancel out any relative delay (skew) of the DTC generated RXC signal on output line 110, a delay 112 is provided in data decoder 400 so that RXC samples the encoded data during each bit-cell at the ¾ bit-cell point, as required for a Manchester phase encoded signal.

The dual TMD circuit, to be described, substantially improves the performance of the Bazes TMD by using two digital filters, each producing a clock. A wideband digital filter produces a highly adaptable (wideband) clock that responds to dynamic jitter for decoding the data and thus improving receive jitter margins. A narrowband digital filter operates on the same data stream and extracts a stable minimum jitter clock that may be used for regenerating the received signal for transmission to the next station in a Token-Ring LAN.

Because the wideband and narrowband clocks are derived from a common received data stream, the phase difference between the two clocks is bounded, differing only by the phase differences introduced by the two filter characteristics, and by any differential noise inherent in the filter process. Because of this fixed phase difference relationship, both bandwidths may be chosen to independently optimize their respective purposes while allowing synchronization between data and clock without the use of an elastic buffer. A maximum delay between the two clocks is held to within a half of a clock period.

The improvement in performance can be achieved at minimal cost because using an all digital implementation allows the use of common resources for both clock recovery circuits. It has been found that the increase in die size for implementing the dual TMD over the Bazes TMD was less than 25% for the clock recovery circuits.

B. Tracking Differential Manchester Decoder (TDMD).

In order to accommodate the TR LAN, the TMD of Bazes, which was designed for decoding Manchester encoded data in an Ethernet LAN, must be modified for regenerating Differential Manchester coded data. More specifically, Manchester decoding only requires one sample per bit-cell. Accordingly, Bazes generates a recovered clock at the same frequency as the data bit-rate (10 MHz and 10 Mbits/sec). Clock regeneration is done by detecting mid-bit-cell transitions and decoding is done by sampling with the regenerated clock, as previously described.

In the case of a Token-Ring (TR) LAN that uses Differential Manchester encoding, the encoded data must be sampled twice in each bit-cell in order to decode and distinguish two non-data symbols (J and K) from the two data symbols (0 and 1). Symbols J and K have no mid-bit-cell transition and are distinguished by J having the same state as the last half of the previous bit-cell, while K assumes the opposite state of the last half or the previous bit-cell.

Symbols J and K are used in the message-start delimiter pattern (J, K, 0, J, K, 0, 0, 0) and in the message-end delimiter pattern (J, K, I, J, K, I, I, E), where E is a frame-bit, or token-error-detection bit for indicating an error detected by any of the stations on a TR LAN.

In the case of the TDMD for use in a TR LAN, the 32-bit sampled pattern out of waveform digitizer 84 is a 32-sample waveform with 1 bit per sample. The waveform represents one half of a bit cell interval. Thus, for a 16 Mbit/second message bit rate, the stable local clock running at a 32 MHz rate produces a 32 one-bit waveform representing a half-bit cell interval with a 0.977 ns interval between samples. The 32-sample half-bit cell waveforms are sequentially presented to upper and lower encoders 92 and 94, respectively, for extracting both center bit-cell transitions and bit-cell boundary transitions.

Because the regenerated clock-rate is twice the data (bit-cell) rate, both center bit-cell transitions and bit-cell boundary transitions are used for clock recovery. The center bit-cell transitions are present except when J or K is transmitted and the bit-cell boundary transitions are data dependent and occur randomly half of the time. The "missing" bit-cell centers or boundary transitions introduce "noise" into the double data clock rate which, in addition to the jitter introduced by the TR, needs to filtered. Accordingly, the masking function of AND-gate 90 of FIG. 7 is not required.

FIG. 10 shows a tracking Differential Manchester Decoder (TDMD) 80', derived from Bazes TMD of FIG. 7, in which bit center detector 300 of FIG. 7 has been replaced by bit transition detector 300' that does not have AND-gate 90 between transition detector 88 and upper and lower encoders 92 and 94. In this manner, all detected transitions are passed on to upper and lower encoders 92 and 94 where the active lines corresponding to bit-cell center and boundary transitions are encoded as a binary number representing the location of the transition in each bit-cell half.

The 32 (N) output lines 124 from transition detector 88 are split into two sets of 16 lines each 128 and 130 respectively representing the upper 16 lines and the lower 16 lines. Lower encoder 94 detects an active line and, if present, encodes the active line location as a binary number (0–15). If an active line is not detected, the no-transition (NT) output is asserted. Similarly, upper encoder 92 detects and encodes an active line position (0–15) within the upper 16 lines 128 and adds N/2=16 to indicate the true position with respect to the 16 lower lines 130. If no active line is detected, the NT output is asserted high. The output lines 132 and 134 are applied to adder 96 for producing the sum (modulo-N) of the two binary values represented on lines 132 and 134. This sum corresponds to an average value for the case when two transitions are detected in the same bit-cell half window spanned by the 32 lines of transition detector 88. When a single transition is detected within a half-bit cell window the single binary value is passed through adder 96 on lines 136 and on to L-type register 98 the binary value on lines 136 is latched by the L-input from NAND-gate 114 being asserted high. Thus latching occurs at each clock cycle except when both NT outputs of upper encoder 92 and lower encoder 94 are high indicating that no transition was detected by either encoder. If no transition is detected by both encoders 92 and 94, the previously latched value is retained, thereby causing that value to be repeated. Output lines 138 of register 98 are applied as an input to digital filter 100 for producing a smoothed (moving average) estimate of the bit-cell transitions on filter output lines 140.

The output of digital filter 100 is applied to shifter circuit 118 for shifting the clock waveform generated by pattern generation 116 so that each clock pulse onset coincides with the filter output value.

The "static" pattern of N-bits at the output of shifter 118 is supplied to DTC 120 which, as previously described, generates a dynamic clock pattern under control of the output taps of SDL 82 to output buffer 142.

A single TDMD clock recovery unit, using the modified Bazes TMD described above and shown in FIG. 10, would be marginally effective in satisfying the Token-Ring LAN jitter specification [IEEE Draft Standard 802, 5Q-D3, 18 Mar 93] because the speed of tracking for the Bazes type device is slower than a PLL type decoder and clock recovery unit (FIG. 4).

C. Dual TDMD Structure

FIG. 11 shows a simplified TDMD clock and data recovery circuit for the Token-Ring LAN wherein the input data is Differential Manchester encoded with an embedded clock. Clock decoder 200 output, RXC, is used to sample (latch) the input encoded data into D-type flip-flop 201 during the rising edge of RXC. Ideally, latch occurs at the mid-point of each bit-cell half period.

The sampled bit stream, RXD, out of the Q output of D-type flip-flop 201, is decoded by using a Differential Manchester decoder circuit. Two samples are used to characterize each bit-cell.

The recovered clock's reaction to phase variations is controlled by the bandwidth of low-pass digital filter 100, as shown in FIG. 10. The purpose of digital filter 100 is to smooth-out the variations in bit-cell center location and boundary transition location estimates from the received Differential Manchester encoded signal, the estimates being represented by the $\log_2(N)$ bit words supplied by L-type register 98. The bandwidth of digital filter 100 is controlled by the TAU control line 188 which controls the bandwidth, $\alpha$, corresponding to the z-plane pole location of the single-pole digital filter 100.

FIG. 12 is an abstracted form of filter 100 as taught by Bazes. The indicia used correspond to elements with the same indicia as in FIG. 10 of U.S. Pat. No. 5,103,466. The bandwidth of the filter is controlled by TAU control 188 which controls programmable shifter 180 that is used to scale the output of adder 170. The value of the scaling is given by $(1-\alpha)=2^{-s}$, where s=0, 1, 2, . . . . The corresponding z-transform transfer characteristic H(z) is given by $$H(z)=Y(z)/X(z)=(1-\alpha)z^{-1}/(1-\alpha z^{-1}) \quad (1)$$

where $z=e^{j\omega T}$, and T is the sampling interval or bit-cell interval. The magnitude-squared frequency transfer characteristic is given by $$|H(e^{j\omega T})|^2=(1-\alpha)^2/(1-2\alpha\cos\omega T+\alpha^2) \quad (2)$$

which is plotted in FIG. 13 for $\alpha=0$, ½, ¾ and ⅞ corresponding to s=0, 1, 2, and 3.

It should be noted that scaling element 180 does not have to be a binary scaling element. The use of a shifter to produce a binary scale factor is a convenience that simplifies the scaling process by avoiding the use of a more general scaling element such as a multiplier. General filter stability considerations require that $0<(1-\alpha)<1$. The actual value chosen within these limits determines the effective bandwidth, $\alpha$, of the filter. Thus, for better control of the filter bandwidth, a more elaborate scaling means is required such as one that uses a combination of different binary scalings ranging from the single binary scaler to a full-multiplying scaler having one binary scaler for each bit of the data word that is to be scaled.

An example of a programmable filter, suitable for use in a Token-Ring network, is described in U.S. Pat. No. 5,546,431. The filter uses a selected subset of binary scaling elements as shown in FIG. 14(a) and has selectable bandwidths as tabulated in FIG. 14(b).

FIG. 14(a) is similar to FIG. 8 except that programmable shifter 180 has been replaced by scaling unit 650, TAU control line 188 by control lines CTLA, CTLB, and CTLC, and feedback line 140 is returned to shifter unit 650 rather than to subtractor unit 182. The input line 138 has 4 bits that represent the transition location number out of L-type register 98 of FIG. 10.

Scaling unit 650 introduces scaling by right-shifting in shift registers 651–653 by 4, 6 or 7, and 5, 6, or 7 bits respectively. Adder 654 adds the shifted outputs of shifter registers 651 and 652 while combining logic 655 combines the output of shift register 653 and the output of D-type register 184 as either a sum or difference. Adder 654 output and combining logic 655 outputs are combined by subtractor 182 and stored in D-type register 184 as the next filter output value after being passed through bit truncating and rounding logic circuit 186.

Control line CTLA selects either a 6 or 7 right bit shift, $S_2$, for shift register 652. Control lines CTLB select either a 5, 6, or 7 bit right shift, $S_3$, for shift register 653. Control line CTLC selects either the sum or difference mode for combining logic 655. Shift register 651 produces a fixed right bit shift, $S_1$, equal to 4.

In this manner scaling unit 650 modifies the transfer function of equation (1) to be $$H(z) = \beta z^{-1}/(1-(1-\beta)z^{-1}) \quad (3)$$

where $$\beta = 1 - \alpha$$

and $$\beta = 2^{-s_1} + 2^{-s_2} \pm 2^{-s_3} \quad (4)$$

The bandwidth, $\overline{BW}$, of the filter in Hertz is given by $$\overline{BW} = \frac{-1}{2\pi T} \ln(1-\beta) \quad (5)$$

where T is the filter clock period. If a clock rate of 32 MHz is assumed, the relationship between p, the selection of control lines CTLA, CTLB, and CTLC, the filter bandwidth and filter bandwidth increment (ABW) is summarized in FIG. 14(b).

For a fixed design, a suitable assortment of fixed binary scaling elements and sum-or-difference units may be selected to achieve the desired bandwidth for filter 100.

FIG. 15 is a block diagram of a dual TDMD system for accepting Differential Manchester encoded input data and producing two output signals: the regenerated clock (RXC), and the decoded data stream (RXD).

The encoded input data is supplied to each of two modified clock decoder 200 circuits of the type described above with one labeled wide bandwidth (WB) and the other narrow bandwidth (NB). The WB clock decoder 1500 is used to regenerate a clock signal, WCLK, from the encoded input data stream which appears at output line 302 and is applied to the CLK input of D-type flip-flop (DFF) 301. The encoded data is applied to the D-input of flip-flop 301 after passing through delay unit 303. Delay unit 303 provides the delay necessary to ensure that the WCLK samples the center of each bit-cell for properly decoding the data. The output at the Q terminal of DFF 301 is the decoded data stream. Thus, WB clock decoder 1500 is used to recover the encoded data. The bandwidth of filter 100 is adjusted for optimal data recovery.

NB clock decoder 1501 is used to regenerate the clock signal imbedded in the input data stream using a clock decoder 200 that has a narrower bandwidth filter 100 than that used in the WB clock decoder. The narrower bandwidth reduces more noise and jitter than the wider band filter of the NB clock decoder.

The output of the NB clock decoder, RXC, is applied to sampling circuit DFF 304 through inverter 305 for sampling data RXD1 produced by DFF 301. The Q output of DFF 304 is a decoded data stream that is synchronous with the recovered clock, RXC.

The waveforms associated with the dual TDMD of FIG. 15 are shown in FIG. 16, lines (a)–(e), in which Tc represents the clock cycle. The Differential Manchester encoded input data is shown on line (a). Line (b) shows WCLK, the detected clock out of the WB clock decoder which is used to sample the data on line (a) on the rising transition resulting in RXD1 (line (c)) out of the Q output of DFF 301. The output clock RXC of the NB clock decoder 1501 is shown on line (d). Because RXC# (logical complement of RXC) is used to sample RXD1, RXD is shown as being clocked by the falling transitions of RXC (rising transitions of RXC#) on line (e). In this manner, the center of each half-bit cell coincides with a rising transition of RXC.

Figure 17:
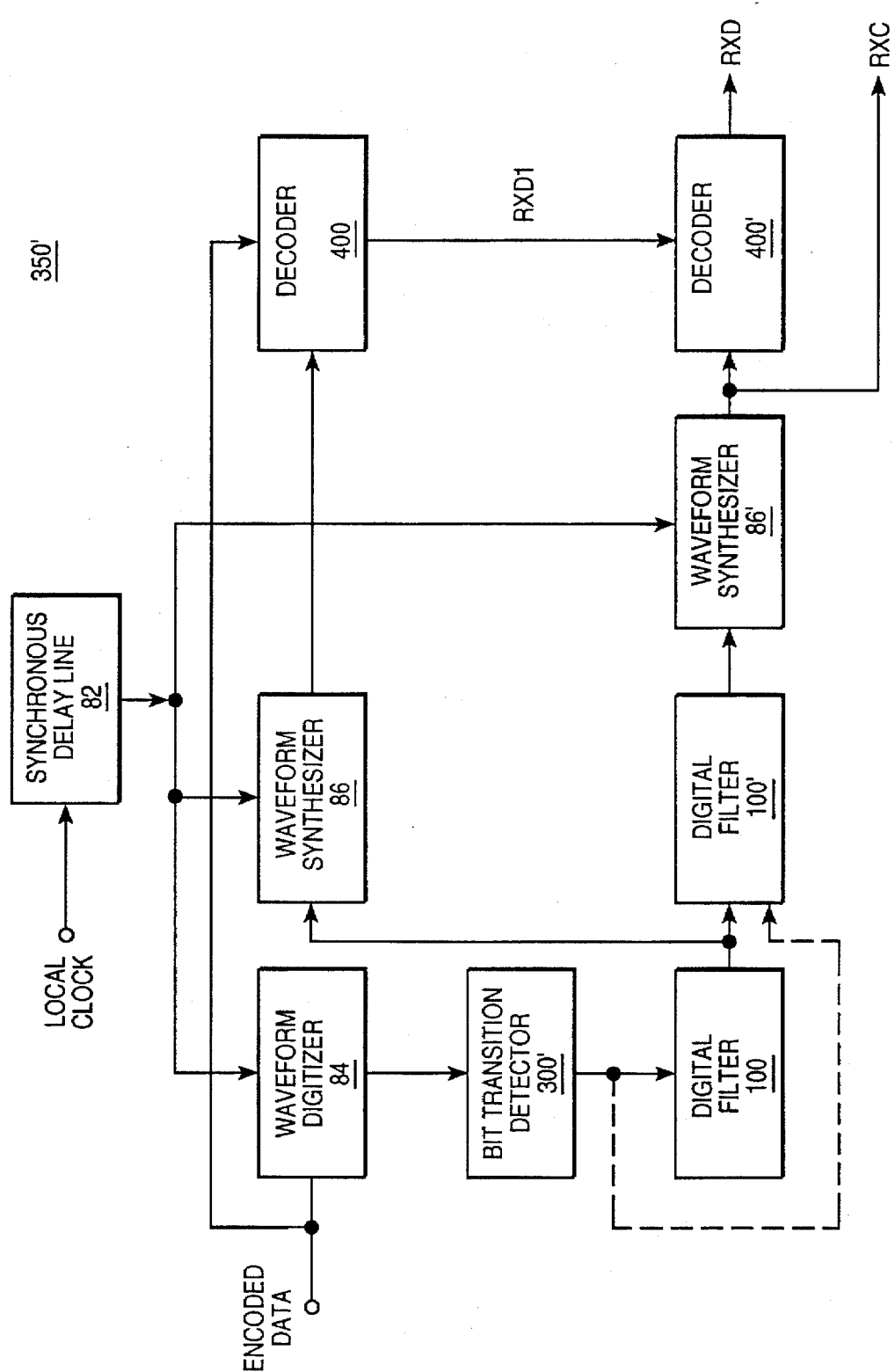
FIG. 17 is a block diagram of a dual TDMD system using shared resources.

FIG. 17 shows an implementation for a dual TDMD 350' in which waveform digitizer 84, bit transition detector 300' and digital filter 100 are shared by the wide band TDMD and the narrow band TDMD. Clearly, the output from transition detector 300' is needed by both TDMDs. The output of digital filter 100 is supplied to waveform synthesizer 86 which generates the wide band clock for decoder 400. Decoder 400 samples the incoming encoded data and produces RXD1 at the decoder output.

The output of digital filter 100 is shown as being supplied to digital filter 100' that provides the additional filtering required for the narrow band waveform synthesizer 86'. The narrow band clock, RXC, out of synthesizer 86' samples RXD1 in decoder 400' to produce RXD as an output.

FIG. 17 also shows an alternative embodiment in which the output of bit transition detector 300' is supplied to both digital filter 100 and 100'. The latter connection is shown as a dotted line from bit transition detector 300' to digital filter 100'. In this configuration the output of digital filter 100 would be accepted by waveform synthesizer 86 and not by digital filter 100'. In this embodiment, digital filter 100' would have the same transfer function as the filter in narrow band clock decoder 1501 of FIG. 15.

D. Token-Ring Operation

Because each ring station is unable to fully compensate for phase distortion introduced mainly by the lobe cables (114 of FIG. 6), phase jitter accumulates as the signal travels around the ring. These accumulated phase errors accumulate at a certain average rate with respect to time. The average rate of accumulation is called the phase slope and is expressed in nanoseconds of jitter per nanosecond of time. The Token-Ring LAN specification limits the maximum phase slope acceptable.

It is known that there is correlation between the filter used in the clock recovery circuit (such filter 100 in clock decoder 200 of the TMD) and the observed residual phase jitter in the recovered clock. A filter bandwidth of less than 400 KHz generally ensures that the accumulated phase jitter is kept within the accumulated phase slope specification limit. The IEEE Draft Standard 802.5Q D3, 19 Mar. 93, Appendix C, indicates that a first order filter of 360 KHz bandwidth has a theoretical dynamic trading error between the recovered and the encoded clock is 7.1 ns. The actual phase jitter, due to delays of 4–5 clock periods in a Bazes type TMD during which phase slopes can contribute additional jitter, is found to equal or exceed 10 ns.

By using a dual TDMD 350 decoder such as shown in FIG. 15, in which a wideband filter is used in the WB TDMD clock decoder to decode the incoming encoded data, the dynamic tracking error is reduced. Worst case analysis indicates that the phase slope is approximately 5 ns, providing adequate margin to reliably sample the encoded data.

Because the WB and NB clock decodes use the same input (the received data stream), the phase difference between the two decoder outputs is limited. This eliminates the need for synchronizing the WB and NB output clocks and also eliminates the need for an additional elastic buffer. An additional delay of only ½ clock period is introduced as shown by comparing RXD1 at line (c) of FIG. 16 with RXD at line (e).

FIG. 18 shows the waveforms associated with a dual TDMD for recovering an encoded message for retransmission for an idealized (noiseless, jitterless) case. Line (a) shows the input waveform with a bit-cell period of 62.5 ns corresponding to a standard bit-rate of 16 Mbits/s. The WB clock, DRXC, with a 32 MHz rate is generated by wide band clock decoder (WB TMDD) 500, of FIG. 19 from the encoded input data. The sampled waveform, ISIG, out of DFF 501 is shown at line (c) of FIG. 18. Similarly, narrow band clock, RCLK, also a 32 MHz clock generated by narrow band clock decoder (NB TDMD) 510 of FIG. 19 and shown at line (d) of FIG. 18, is used to sample ISIG and results in output signal RCVR at the Q output of DFF 502. Signal RCVR represents the recovered waveform of the encoded signal that is synchronous with NB-clock RCLK.

FIG. 20 shows a set of waveforms generated by a dual TDMD when tracking error (phase slope) is present. A constant phase slope corresponds to a constant rate difference between a reference clock at the station of origin and the clock rate observed (estimated) at a downstream station.

The vertical dotted line labeled 0, represents the ideal point in time for sampling the state of the first-half of the bit-cell.

If a single TMD clock decoder (prior art) were to be used for recovery of the DATA_IN waveform (line (a)), then the sampling point, corresponding to the rising transition of RCLK could be as early as indicated by dotted line 1 because the compromise narrower band filter cannot respond to fast dynamic jitter changes without further degrading the recovered clock jitter error.

By using a dual TDMD system with a wider filter for the WB TDMD, the WB recovered clock can respond faster to phase errors and contain the variation in sampling point to a narrower region as indicated by dotted line 2. Resampling ISIG with the NB clock, RCLK, results in a recovered and resynchronized encoded data signal, RCVR, that has a minimized resampled jitter error as indicated by dotted line 3.

The time window within which resynchronization of ISIG with RCLK must occur is between dotted line 2 and the rising transition of DRXC. If the phase difference between RCLK and DRXC enables correct sampling by RCLK, the margin available for tracking error is increased because the dynamic tracking error is the reduced tracking error of the quick response wide band filtered clock, DXRC.

It should be noted that the principles described above concerning the use of dual TDMD units for decoding and regenerating phase encoded data may be practiced with other clock recovery methods including the prior art methods previously described. For example, a wide bandwidth phase-locked-loop (PLL) decoder could be used as the wideband TMD clock decoder 1500 and a narrow bandwidth PLL as the second narrow bandwidth clock decoder 1501 of FIG. 15.

Also, the dual TDMD system described may also be used to decode data and the associated embedded clock for other forms of binary phase encoded data and in communication systems other than the Token-Ring LAN. For example, a Manchester encoded message, such as in the Ethernet LAN, may be operated-on by the system of FIG. 15 by extracting the center bit-cell transitions using a Bazes type TMD for both the narrow and wide bandwidth clock decoders. The wide bandwidth decoder sampling the Manchester encoded data at the ¾ bit-cell position to determine the message state while the narrow bandwidth clock decoder resynchronizes the decoded signal (RXD1) for retransmission. The method and apparatus described is generally applicable to communications systems using phase encoded binary signals having an embedded clock.

These variations, and others, in the use of the principles taught by this inventor will become apparent to those practicing the art.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A dual clock tracking decoder circuit for use in a communications system for regenerating a received binary phase encoded message, hereinafter referred to as the input message, with a prescribed bit rate by extracting an embedded clock in the input message, the embedded clock having a rate that is twice the prescribed bit rate, and regenerating the input message by resampling the input message once during each half-bit cell, the dual clock tracking decoder circuit comprising:

(a) a first clock decoder circuit with an input for accepting the input message, the first clock decoder circuit for recovering from the input message, and outputting at an output, a first clock signal with a rate that is twice the prescribed bit rate, the first clock decoder circuit configured to be tolerant to incoming phase jitter;

(b) a second clock decoder circuit with an input for accepting the input message, the second clock decoder circuit for recovering from the input message, and outputting at an output, a second clock signal with a rate that is twice the prescribed bit rate, the second clock decoder circuit configured to reduce accumulated jitter;

(c) a first sampling circuit with an input for accepting the input message, a sampling control input connected to the output of the first decoder circuit output for generating at art output a first resampled message that is a representation of the input message and is synchronous with the first clock signal; and (d) a second sampling circuit with an input connected to the output of the first sampling circuit for accepting the first resampled message, a sampling control input connected to the output of the second clock decoder output for producing at an output a second resampled message as a representation of the input message that is synchronous with the second clock signal.

2. The dual clock tracking decoder circuit of claim 1 wherein the first clock decoder circuit and the second clock decoder circuit comprise:
   (a) a state transition detector circuit with an input for accepting the input message and producing at an output a signal representative of the input message state transitions location in each half-bit cell of the input message,
   (b) a filter having an input connected to the state transition detector circuit output for producing, at an output, a signal representative of a moving average of the state transition locations in each half-bit cell of the input message, and
   (c) a clock generator circuit with a control input connected to the filter output for to controlling the location of an output clock state transitions corresponding to the filter output signal,
   the filter of the first clock decoder circuit having a wider bandwidth than the filter of the second clock decoder circuit.

3. The dual clock tracking decoder circuit of claim 2 wherein a single state transition detector circuit is commonly shared by the first clock decoder circuit and the second clock decoder circuit.

4. The dual clock tracking decoder circuit of claim 3 wherein the input to the filter of the second dock decoder circuit is the output of the filter of the first clock decoder circuit for sharing the filter of the first clock decoder circuit resources and for effectively reducing the bandwidth of the filter of the second clock decoder circuit.

5. The dual clock tracking decoder circuit of claim 1 wherein the first sampling circuit and the second sampling circuit each comprise a D-type flip-flop.

6. The dual clock tracking decoder circuit of claim 1 wherein the first clock decoder circuit, the second clock decoder circuit, the first sampling circuit, and the second sampling circuit are digital circuits.

7. The dual clock tracking decoder circuit of claim 1, wherein the communications system comprises a Token-Ring local area network.

8. A dual clock tracking decoder circuit for use in a communications system for regenerating a received binary phase encoded message with a prescribed bit rate, the received binary phase encoded message hereinafter referred to as the input message, the dual clock tracking decoder circuit operating synchronously with a local stable clock having a clock rate that is twice the prescribed bit rate, the dual clock tracking decoder circuit operating by extracting an embedded clack in the input message, the embedded clock having a rate that is twice the input message bit rate, and generating a recovered clock, comprising:
   (a) a first clock decoder circuit and a second clock decoder circuit for recovering a clock signal from the input message, both the first clock decoder circuit and the second clock decoder circuit comprising,
   (i) an input for accepting the input message,
   (ii) a transition detector circuit connected to the input for detecting and outputting a sequence of state transitions in the input message, each state transition corresponding to an embedded clock pulse edge,
   (iii) an encoder circuit connected to the transition detector circuit for generating a location signal representative of each state transition location relative to pulses of the local stable clock,
   (iv) a filter connected to the encoder circuit output for generating at an output a moving average of the location signal, and
   (v) a clock waveform generator connected to the filter output for generating a recovered binary clock signal at an output with the rate of the local stable clock, each recovered binary clock signal pulse location corresponding to the momentary value of the moving average of the location signal relative to the pulses of the local stable clock, the filter of the first clock decoder circuit having a faster response time than the filter of the second clock decoder circuit;
   (b) a first sampling circuit with a data input for accepting the input message, and a sampling input connected to the output of the first clock decoder circuit for producing an output signal at an output by sampling the input message synchronously with the recovered binary clock signal of the first clock decoder circuit; and
   (c) a second sampling circuit with a data input connected to the output of the first sampling circuit and a sampling input connected to the second clock decoder circuit for producing a signal representative of the input message with state transitions that are synchronous with the recovered binary clock signal of the second clock decoder circuit.

9. The dual clock tracking decoder circuit of claim 8 wherein the local stable clock operates at a rate of 32 MHz.

10. The dual clock tracking decoder circuit of claim 9 wherein the filter of the first clock decoder circuit has an approximately 1 MHz bandwidth and the filter of the second clock decoder circuit has an approximately 330 KHz bandwidth.

11. The dual tracking decoder circuit of claim 10 wherein the filter of the first clock decoder circuit and the filter of the second clock decoder circuit are digital single-pole low-pass filters.

12. The dual clock tracking decoder circuit of claim 8 wherein the first sampling circuit and the second sampling circuit each comprise a D-type flip-flop.

13. The dual clock tracking decoder circuit of claim 8 wherein the first clock decoder circuit, the second clock decoder circuit, the first sampling circuit, and the second sampling circuit are digital integrated circuits.

14. The dual clock tracking decoder circuit of claim 8 wherein communications system comprises a Token-Ring local area network.

15. A method for use in a communication system with a prescribed bit-cell rate for regenerating a binary phase encoded received message at a local station having an imbedded clock with a rate that is twice the prescribed bit-cell rate, the local station having a local stable clock with a rate equal to twice a token ring local area network bit-cell rate, the method comprising:
   (a) accepting the binary phase encoded received message;
   (b) generating a short term average clock from the imbedded clock with the rate of the local stable clock;
   (c) generating a long term average clock from the imbedded clock with the rate of the local stable clock;
   (d) sampling the binary phase encoded received message using the short term average clock to produce a binary output signal synchronous with the short term average clock and representative of the binary phase encoded received message; and
   (e) resynchronizing by sampling the binary output signal using the long-term average clock.

16. The method of claim 15 wherein the communication system comprises a Token-Ring local area network station.

17. A method for regenerating a received binary phase encoded message in a communications system at a local station having a stable local clock with a rate equal to twice a bit-cell rate of a token ring local area network, the received message having an imbedded clock with a rate equal to twice the bit-cell rate of the token ring local area network, ale method comprising:

(a) receiving the binary phase encoded message;

(b) extracting pulse transition locations from the imbedded clock;

(c) forming a short term moving average of the pulse transition locations;

(d) generating a first clock with a rate equal to the stable local clock rate and with clock pulse edges corresponding to the short term moving average of the pulse transition locations;

(e) sampling the binary phase encoded message using the first clock and generating a first binary message corresponding to the sampled message;

(f) forming a long term moving average of the pulse transition locations;

(g) generating a second clock with a rate equal to the stable local clock rate and with clock pulse edges corresponding to the long term moving average pulse transition locations;

(h) resynchronizing the first binary message by sampling the first binary message using the second clock and generating a regenerated binary phase encoded message corresponding to the first binary message.

18. The method of claim 17 wherein the communication system comprises a Token-Ring local area network station.

19. A dual clock tracking decoder circuit for use in a communications system for decoding and regenerating phase encoded data having an embedded clock, the dual clock tracking decoder circuit comprising:

(a) a wideband clock decoder circuit for recovering and outputting a first clock signal from an input message, the wideband clock decoder circuit including a first filter;

(b) a narrowband clock decoder circuit for recovering and outputting a second clock signal from the input message, the narrowband clock decoder circuit including a second filter, the second filter having a narrower bandwidth than the first filter;

(c) a first sampling circuit coupled to the wideband clock decoder circuit for receiving the first clock signal, the first sampling circuit for receiving the input message and outputting a first resampled message based upon the input message, the first resampled message being synchronous with the first clock signal; and (d) a second sampling circuit coupled to the first sampling circuit and the narrowband clock decoder circuit for producing a second resampled message corresponding to the first resampled message that is synchronous with the second clock signal.

20. A method for regenerating a received binary phase encoded message by a dual clock tracking decoder circuit in a communications system, the dual clock tracking decoder circuit including a wideband clock decoder circuit and a narrowbad clock decoder circuit, the received binary phase encoded messages having an embedded clock, the method comprising the steps of:

(a) recovering a first clock signal from an input message using a first filter of the wideband clock decoder circuit;

(b) recovering a second clock signal from the input message using a second filter of the narrowband clock decoder circuit, the second filter having a narrower bandwidth than the first filter;

(c) generating a first resampled message based upon the input message, the first resampled message being synchronous with the first clock signal; and (d) outputting a second resampled message corresponding to the first resampled message that is synchronous with the second clock signal.

* * * * *

UNITED STATES PATENT AND TRADEMARK OFFICE
CERTIFICATE OF CORRECTION

PATENT NO. : 5,696,800        Page 1 of 2
DATED : December 9, 1997
INVENTOR(S) : Lior Berger It is certified that error appears in the above-identified patent and that said Letters Patent is hereby corrected as shown below:

In the Title Page at [57] at line 10 delete "resynohronized" and insert --resynchronized--

In the Title Page at [57] at line 17-18 delete "resynohronize" and insert --resynchronize --

In column 1 at line 42 delete "tp" and insert --to--

In column 1 at line 54 delete "(sampTing)" and insert --(sampling)--

In column 14 at line 58 delete "art" and insert --an--

In column 15 at line 15 delete "to" prior to "controlling" and following "for"

In column 15 at line 26 delete "dock" and insert --clock--

In column 15 at line 49 delete "clack" and insert --clock--

In column 17 at line 4 delete "ale" and insert --the--

UNITED STATES PATENT AND TRADEMARK OFFICE
CERTIFICATE OF CORRECTION

PATENT NO. : 5,696,800
DATED : December 9, 1997
INVENTOR(S) : Lior Berger

It is certified that error appears in the above-identified patent and that said Letters Patent is hereby corrected as shown below:

In column 18 at line 22 delete "narrowbad" and insert --narrowband--

Signed and Sealed this

Twenty-first Day of April, 1998

Attest:

BRUCE LEHMAN

Attesting Officer

Commissioner of Patents and Trademarks